United States Patent [19]

Higuchi et al.

[11] Patent Number: 4,830,508
[45] Date of Patent: May 16, 1989

[54] CONTROLLING METHOD AND A MEASURING MIXER FOR LIQUIDS AND POWDERS

[75] Inventors: Noboru Higuchi; Keizo Matsui; Chuzo Kobayashi; Hiroshi Ohnishi; Shigeru Yamaguchi, all of Kanagawa, Japan

[73] Assignee: Fuji Photo Film Co., Ltd., Kanagawa, Japan

[21] Appl. No.: 189,099

[22] Filed: May 2, 1988

[30] Foreign Application Priority Data

| May 1, 1987 | [JP] | Japan | 62-106413 |
| May 1, 1987 | [JP] | Japan | 62-106414 |
| May 1, 1987 | [JP] | Japan | 62-106415 |
| May 7, 1987 | [JP] | Japan | 62-109686 |
| May 8, 1987 | [JP] | Japan | 62-110857 |

[51] Int. Cl.⁴ .................. B01F 15/04; G05D 11/00
[52] U.S. Cl. .......................... 366/152; 137/88; 222/56; 366/18; 366/20; 366/21; 366/141
[58] Field of Search .......... 366/18, 16, 17, 19, 366/20, 21, 8, 141, 152, 153, 160, 161, 162; 137/88; 222/56, 55, 77

[56] References Cited

U.S. PATENT DOCUMENTS

| 3,860,030 | 1/1975 | Mayer | 137/88 |
| 4,209,258 | 6/1980 | Oakes | 366/152 |
| 4,525,071 | 6/1985 | Horowitz | 366/18 |
| 4,581,704 | 4/1986 | Mitsukawa | 366/160 |
| 4,629,392 | 12/1986 | Campbell | 222/56 |

FOREIGN PATENT DOCUMENTS

| 52-37692 | 3/1977 | Japan . |
| 53-29476 | 3/1978 | Japan . |
| 56-74715 | 6/1981 | Japan . |
| 56-148019 | 11/1981 | Japan . |
| 56-155412 | 12/1981 | Japan . |
| 57-29114 | 2/1982 | Japan . |
| 57-72015 | 5/1982 | Japan . |
| 58-163426 | 9/1983 | Japan . |

Primary Examiner—Robert W. Jenkins
Attorney, Agent, or Firm—Sughrue, Mion, Zinn, Macpeak, and Seas

[57] ABSTRACT

A measuring mixer for use with either liquids or powders in which different supply systems supply different stock liquids or powders to a receiving container from supply containers. A continuously variable flow regulator is associated with each supply container. The cumulative weight of the receiving container is measured and compared with a target weight. Then a computation section calculates a desired flow rate based upon both the deviation from the target weight and a time variation thereof. This calculation is preferably done according to fuzzy inference. The desired flow rate is then used to control a selected one of the flow regulators so that the measurement is sequentially performed between supply systems. Optionally, the receiving container can be movable between the different supply systems.

29 Claims, 22 Drawing Sheets

| SET VALUE | MEASUREMENT TIME | MEASUREMENT ACCURACY |
|---|---|---|
| 10.000 g | 130.0 sec | ± 0.5 g |
| 4000 g | 116.2 sec | ± 0.5 g |
| 1000 g | 61.5 sec | ± 0.5 g |
| 500 g | 53.9 sec | ± 1.0 g |
| 200 g | 34.8 sec | ± 1.0 g |
| 100 g | 38.8 sec | ± 1.0 g |

CONTROLLING METHOD AND A MEASURING MIXER FOR LIQUIDS AND POWDERS

DESCRIPTION

1. Field of the Invention

The present invention relates to a liquid or powder measurement controlling method and an apparatus thereof. More particularly, the invention relates to a liquid/powder measurement controlling method and an apparatus which are intended to have an improved measuring accuracy, an expanded measuring range and a constant measuring time. These objects are obtained by sequentially varying the flow velocities of substances to be measured on the basis of an observed quantity obtained during the measurement.

The present invention also relates to a liquid or powder measuring mixer for producing a new mixed liquid or powder by intermixing a variety of stock liquids or powders after measuring these liquids or powders.

2. Background Art

A liquid can be measured by the use of a variety of systems, such as a weight system (e.g., load cell), a pressure system. (e.g., differential pressure transmitter), a capacity system (e.g., oval flowmeter) and so on. For the measurement of a pulverulent body or fine powder, there is known the weight system which mainly employs a load cell or the like.

In all these systems, however, the measurement control is performed on the basis that the flow velocity is constant. A closed loop measurement controlling system in which the flow velocities are successively varied does not come under the above-described concept.

For the purpose of enhancing the measuring accuracy, the following techniques have in the past been utilized.

In a first technique, as described, for example, in Japanese Patent Publication No. 148019/1981, the flow velocity changes between two stages and the measurement is made by a change-over to a slow flow velocity in the vicinity of the target value.

In a first example of the first technique two kinds of devices have different flow velocities. The change-over between the two is executed when the deviation between the target value and the actual measurement value reaches a given conditional value. In a second example of the first technique, a single device has the capability to change-over the flow velocity to two kinds of fixed conditions. The change-over is executed, as in the first example, when the deviation reaches the given conditional value. In a third example, based on the concepts of the first and second examples, the conditional value for commanding the change-over is modified from the previous measurement result by adding a learning function identified as a software function.

In a second technique, such as disclosed in Japanese Patent Laid-Open Application No. 29114/1982, there is an inflow level (also referred to as a head quantity) used as a measurement halting condition. The measurement technique is arranged such that the measurement is previously stopped in anticipation of the inflow level. In a first example of the second technique, the measurement stops when the deviation between the target value and the actual measurement value reaches the given condition. In a second example, the situation is almost the same as that in the third example of the first technique. However, the conditional value for commanding the halt of measurement is modified by an arithmetic calculation based on the preceding actual measurement result.

In order to attain highly accurate measurement, the measuring device applied to the liquid or powder measuring mixer has heretofore been confined to such a type that the flow velocity of the liquid or powder is limited and generally fixed. The measuring device of such a type that the flow velocity is variable has not been seen so far.

Where liquids or powders are fed from a plurality of supply containers to another container, a conventional type of liquid or powder measuring mixer is required to have the measuring devices attached to the individual supply containers.

For instance, when a capacity measuring system is used, as illustrated in FIG. 1, two separate measuring devices are employed for the two kinds of liquids or powders. There are required two control units with separate control functions for two loops to predictively control the quantities flowing into the mix container.

A "Liquid Adjusting Apparatus" and a "Method of Supplying Liquid" are disclosed in Japanese Patent Laid-Open Application No. 74715/1981 and Japanese Patent Publication No. 163426/1982, respectively. Based on the above-described method and apparatus, the flow rates of the plurality of liquids are sequentially measured by means of a common measuring device. Liquid supply means attached to the respective containers to feed out the liquids are controlled by independent control loops.

Namely, the flow rate of the liquid or powder differs according to the quantity of liquid or powder stocked in the supply container, according to the flow rate characteristics of the valve and according to liquid or powder properties. Hence, a highly precise measurement cannot be expected under the same control.

This situation is the same with a tank measuring system. It is required that actuator stop valves attached to respective systems are controlled by control systems of independent loops.

With a view to achieving a highly accurate measurement, there has been proposed a method of performing change-over between two flow rates in accordance with a predetermined measurement deviation by providing two parallel valves, the flow velocities of which are different from each other. Change-over between the two paths is executed at a predetermined difference between the desired and measured amounts. In this case, however, fulfillment of the control function requires the control of two loops.

The reason why it is said that the control functions of two loops is required is that when making use of a dispersive type control unit, two separate control units are not necessary, because the measuring process can be done in the single control unit. Judging form the number of inputs and outputs and softwares as well, however the two separate control units are required.

Further, there is disclosed in Japanese Patent Laid-Open Application No. 148019/1981 and Japanese Patent Laid-Open Application No. 155412/1981 a control system for adjusting the flow rate of powders or by adjusting a predetermined period at the next measuring cycle by computing a mean flow rate from the total discharge weights of substances to be measured at a given number of previous measuring cycles and from a time required and by further obtaining a deviation between this mean flow rate and a target value.

The flow rate of the powder, however, differs according to residual quantities of the powder within the supply containers, the target value properties of the powder. Hence, the highly accurate measurement cannot be expected under the same control function.

In order to achieve a highly accurate measurement of powders, there is proposed a method (Japanese Patent Laid-Open Publication No. 72015/1982) of effecting a change-over between the two flow rates in accordance with a predetermined measurement deviation. In this case, however, fulfillment of the control functions requires the control of two loops.

However, in the conventional measurement control, the change-over is carried out, as explained above, by making the flow velocity constant or by varying the velocity in two stages. There arise, however, the following problems inherent in the prior art measurement control, because the measurement is fixed within a certain range.

A first problem is a lack of measuring accuracy. A situation arises where the accuracy becomes unreliable due to fluctuations in flow velocity which are caused by disturbances and variations in properties of the substance to be measured, whether it be fluid or powder. In the case of gravity transfer, the fluctuations in flow velocity are created in the measured substance which flows out in accordance with the residual amount. This residual amount is hereinafter in this specification referred to as a head difference of the measured substance disposed in the container on the upper stream side of the measuring point. If the head difference is large, however, the flow velocity is in excess of the certain conditional range, and accuracy is thereby degraded. This fact also results in the restriction of the allowed variation of the head difference. In order to keep the head difference within a predetermined scope, it is strictly required that the measurement be stopped, or alternatively, the container disposed on the upper stream side be properly resupplied with a raw material. This also secondarily increases cost and causes a loss of raw material.

Especially, the fluidity of a hygroscopic powder or of a powder subject to bridging differs, depending on ambient storage conditions. In a system in which the powder is used while being reserved in the supply containers, its fluidity varies according to variations in ambient conditions, for instance, temperature, humidity and vibrations caused by supplementary devices such as a vibrator, an air knocker and so forth which are intended to foster the fluidity. For this reason, flow conditions become different and it follows that the measuring accuracy is degraded. To cope with this degradation, restrictions are imposed for both duration of storage and for the ambient conditions under which the device is installed in order to maintain the measuring accuracy. This, as a result, increases the initial costs and the running costs of the equipment.

A second problem is the restricted measuring range. Since the flow velocity is restricted a ratio of the minimum to the maximum of the measurable measurement value is approximately 1:5. In a 2-stage flow velocity system, the ratio is approximately 1:10 at the most. The reason why the measurement range is narrow will be explained as follows. Even if the measurement is halted, an extra amount of the material continues to flow in because of a delay of response of the system. This extra inflow quantity is determined by the flow velocity. Hence if the target value is small, the extra inflow quantity exceeds a guaranteed accuracy, and it follows that the measuring range is restricted. Alternatively, the allowable extra inflow quantity can be controlled by narrowing the measuring range under the condition that the flow velocity is constant. Where the same kind of liquid or powder is measured, multiple measuring devices each having their proper measuring range are needed but this multiplicity augments the number of devices. In production plants which deal with a wide variety of materials, there are some measuring systems of the type in which the ratio within the measuring range is about 1:100 at most in the case of the same raw material. Therefore, it is necessary to select the measuring devices within a range of target values.

A third problem is the lengthy measuring time. A measuring time is contingent on the target value. When the target value is small the measuring time is short, and vice versa. When the target value is small, an operating time of the system is subject to scatter, whereby the measuring accuracy is not assured. This also leads to a narrower measurement range. Consequently, multiple appropriate measuring devices are needed in accordance with the required measurement values, thereby increasing the number of devices In the light of the entire system for producing a new mixture by combining multiple already-measured substance, the production capability is determined by the measuring time. Especially in a pipeless transfer production system the carrying capability is limited.

The above-described defects further results in economic disadvantages in terms of setting up the equipment for the process. Such is the prior art arrangement that a multiplicity of independently controlled measuring devices are provided in accordance with the target values and a separate measuring device has to be prepared for every raw material or to provide an optimum measuring time because of the restriction of the production capability. Also, a separate measuring device is required for each supply container. Hence, the system becomes complex and a large number of measuring devices have to be available.

The situation is the same with a liquid tank or powder hopper measuring system. It is required that stop valves attached to actuators in individual systems be controlled by independent loop control systems (See Japanese Patent Laid-Open Nos. 29114/1982, 163426/1983 and 74715/1981).

The prior art powder measuring mixer is equipped with the measuring devices attached to the individual supply containers in order to feed the powders from the receiving container (See Japanese Patent Application Laid-Open Nos. 148019/1981, 155412/1981 and 72015/1982).

SUMMARY OF THE INVENTION

Accordingly, in view of the above difficulties, it is an object of the present invention to provide a measurement controlling apparatus and method for liquids and powders which is capable of attaining a highly accurate measurement without being subject to fluctuations in flow velocity that are produced due to disturbances and variations both in the viscosity of the liquid or the fluidity of the powder; of ensuring a wide measurement range; and of performing the measurement within a short period of time without depending upon the magnitude of a target value.

To this end, according to one aspect of the invention, there is provided a measurement controlling apparatus for accomplishing this measurement controlling method.

The precise measurement controlling apparatus which constitutes the system brings about a reduction in the number of mechanical elements, enhances the capability of the equipment and decreases the loss of raw materials.

In accordance with this liquid and powder measuring mixer the system is constructed by employing a measurement control unit for performing the measurement in a short time regardless of the magnitude of a target value. Thereby, the equipment is simplified, the production capability is augmented, and a loss of raw materials is following significant economic benefits:

(1) a decrease in initial cost which is derived from a reduction in the number of devices, (2) a decrease in the required maintenance which is attributed to the drop in the number of devices, (3) a decreased failure rate which is associated with improved reliability and the reduction in the number of devices, and (4) a decrease in running cost which is due to the drop in loss of the raw materials.

The above-described object is accomplished by a liquid or powder measuring mixer in which a small number of measurement control units momentarily vary the flow velocity under closed loop control when measuring a liquid or powder. The liquid or powder measuring mixer according to the present invention is composed of the following components.

(1) Supply container (or tank): This container is designed for storing the liquid or powder to be measured and has a capacity suited to the scale of production. In accordance with the, present invention, there is no limit on the residual quantity of the material remaining in the container. Theoretically, the measurement is practicable up to a zero residual quantity. There is no final influence caused by values of liquid material property values (e.g., viscosity for a liquid or granularity for a powder). Any kind of liquid or powder can be measured down to zero residual quantity as long as the liquid or powder flows.

(2) Flow velocity control unit: The flow velocity control unit has several flow velocity controllers, the number of which corresponds to the number of the supply containers. For a liquid mixer, the flow velocity controllers are opening control valves. The opening control valves are intended to vary the flow velocity by changing a degree of opening thereof. For a powder mixer, the flow velocity controllers may be a screw feeder or a damper. In the screw feeder, the flow is controlled by issuing a rotational frequency command. In the damper, the flow is varied by changing the opening degree. A driving mechanism for the valves and other flow controllers involves the use of, for instance, an AC servo motor.

(3) Change-over device: This change-over device helps a driving control unit control the plurality of flow velocity controllers. If a driving control unit is provided for every opening control valve or flow velocity controller, the change-over device is not required. In some cases, however, the change-over device is provided to reduce the costs.

(4) Measuring device: One measuring device is provided on the side of the liquid or powder receiving container and measures the liquid or powder sent from the plurality of supply containers. The measuring device performs cumulative measurement of the weights of the mixed liquid or powder. A tank or hopper measuring system employs a load cell a differential pressure transmitter or a level gauge. An additional measuring device may be fitted to a supply container, or alternatively the supply container is mounted on a measuring board.

(5) The measurement control unit accomplishes precise closed loop measurement control for varying the flow velocity and serves to measure the respective liquids or powders with the aid of a single measuring device. The plurality of liquids or powders can be measured by the single measuring device in the same container so the number of devices can be reduced. The change-over device is part of the measurement control unit.

(6) Liquid or powder receiving container (or tank): This container has a capacity adapted to the scale of production. Mixable liquids or powders are cumulatively measured. If cleaning is performed for every transfer of the measured liquid, the measurement can independently be done in the same container even in an unmixed state. Stirring and mixing may be conducted in this container.

(7) Moving device: The moving device is designed for carrying the liquid or powder receiving container. The moving device involves the use of an unmanned carriage, a conveyor and so on. In connection with a carrying mode, the liquid or powder receiving container itself may be movable, or alternatively this movable function may be provided by a separate structure.

The fundamental components of the present invention have been described above but it is a basic concept that is employs a closed loop measurement control unit for varying the flow velocity. In some cases, a wide variety of other supplementary devices are provided.

For example, individual containers for liquids may be equipped with spray bowls or the like for cleaning and change-over valves may be interposed in the pipes. The respective liquid containers may be provided with stirrer for mixing. Furthermore, hot water from a thermostatic oven may be circulated for maintaining the temperature.

There are a wide variety of flow velocity controllers for varying the flow velocity of a powder. The flow velocity controller may be a rotary system in which a screw feeder changes the flow in response to a command of rotational frequency. Another system, usable if the powder is highly fluid, varies the flow by changing the opening degree of a damper in response to a positional command. In addition, a shutter gate may be used as a flow stopping type.

The condition that the flow velocity remain constant is the fundamental factor which causes drawbacks inherent in the conventional measuring device. In the measurement controlling method, however, the flow velocity is variable under closed loop control, thereby attaining a highly accurate measurement subject to no influence of fluctuations in flow velocity which are caused by disturbances.

It further attains a wide range of measurement and a short time measurement does not depend on the magnitude of the target value.

To accomplish the above, the measurement controlling apparatus is characterized by the following system and components including a control system, a detector and an operating device.

The control system may be defined as a non-linear type when modelling is considered. Therefore, the actualization cannot easily be made by a prior art simple PID control system.

To cope with this, an optimum manipulated variable is computed from a deviation between the target value and the actual measurement value and also from an observed quantity of the time variation of the deviation under fuzzy control or learning control or optimum control. Subsequently, the measurement control is accomplished by sequentially changing the flow velocity to an optimum state in a continuous and descrete manner.

The detector serves to observe momentary variations in the measured value. It is satisfactory that the detector is able to observe the measured values of a load cell, a differential pressure transmitter and so forth. However, the measuring range is contingent upon the static accuracy of the detector.

The operating device is intended to vary the flow velocity. The operating device is composed of mechanical parts and electric drivers although the driving may be performed with a fluid like air or oil.

In the case of a liquid, a general practice is that the flow velocity is varied by varying an opening. In this case, a valve to be used may involve well known control valves assuming different configurations or a novel valve having a notch-groove in its valve peripheral surface in a valve-driving direction so that a flow rate can be varied. It is sufficient for the well known valves to have common flow rate characteristics except for quick opening. A satisfactory arrangement of a valve is that the flow velocity successively varies from zero. There are many kinds of other methods, but any apparatus capable of changing the flow velocity from zero may be applicable.

Additionally, a moving device may be provided for moving the liquid or powder receiving container is provided. The liquid or powder receiving container can be carried by the moving device. (1) Hence, the liquid or powder received from all the supply containers and are measured by using no fixed pipes or ducts and consequently, there is created versatility in equipment by decreasing the number of the receiving containers. In the case of producing multiple liquids or powder bodies, mechanical play in the equipment on the part of the receiving containers can be eliminated. Besides, it is feasible to cope with changing processes while still restricting an increase in the number of equipment to the utmost. (2) It is possible to accelerate the measuring cycle by moving the receiving container so that a change with passage of time can be minimized. (3) A stirrer can be fitted to the container for receiving the liquid or powder transferred from the supply containers, thus constituting an adjusting or reaction tank. (4) For a liquid, there is no need for a connecting pipe nor for its cleaning.

In a commonly used method in handling powder, a screw feeder varies the amount of transfer of the powder by changing a rotational frequency of a motor.

BRIEF DESCRIPTION OF THE DRAWINGS

FIG. 7 showing a large flow velocity type valve and FIG. 8 showing a small flow velocity type valve.

DETAILED DESCRIPTION OF THE PREFERRED EMBODIMENTS

The preferred embodiments of the present invention will hereinafter be described with reference to the accompanying drawings.

Figure 1:
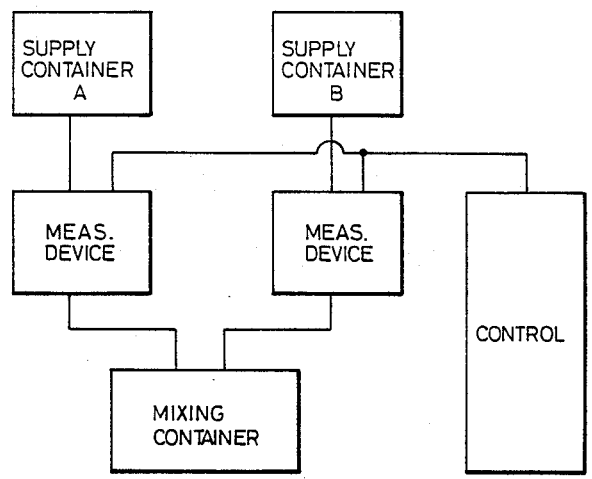
FIG. 1 is a block diagram illustrating a conventional measuring mixer.
Figure 2:
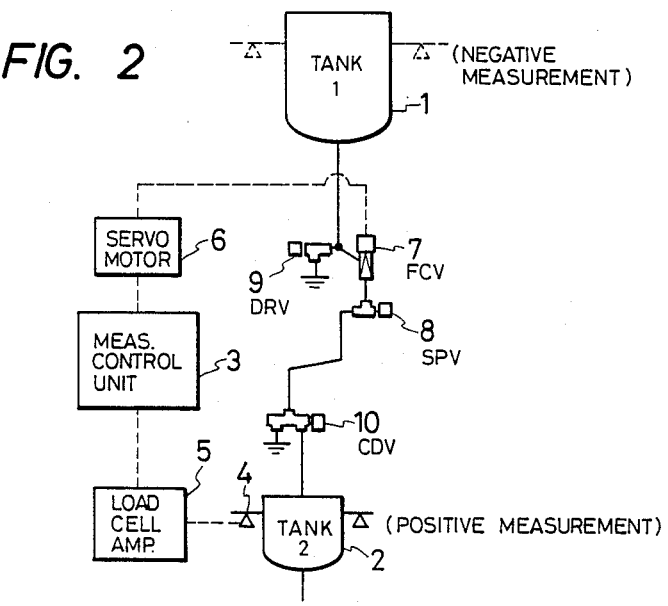
FIG. 2 is a diagram illustrating a liquid measuring device applied to one embodiment of the present invention.

Turning now to FIG. 2, there is illustrated a liquid measuring device, which is one embodiment of the present invention. The description will concentrate on the case where a material filling a supply tank 1 provided on the upstream side is transferred to a measurement tank 2 on the downstream side, and a weight of the liquid is measured by a load cell 4 attached to the measurement tank 2.

A drain valve (DRV) 9 including a flow control valve (FCV) 7 serving as an operating device for varying the flow velocity, a stop valve (SRV) 8 and a cleaning/effluent valve (CVD) 10 are sequentially arrange on a piping path between the supply and measurement tanks 1 and 2. The measurement tank 2 provided on the downstream side is equipped with the load cell 4 serving as a detector for measuring the weight of the substance to be measured. The load cell 4 is connected through a load cell amplifier 5 to a measurement control unit 3. The measurement control unit 3 is connected to a servo driver 6 and the flow control valve which constitutes the operating device.

The measurement of the substance by the above liquid measuring device is initiated by setting a target value to the measurement control unit 3 and further by changing over the drain valve 9 and the cleaning/effluent valve 10 to the path to the measurement tank 2. The target value includes both the weight of new material to be measured and the previous weight of the measurement tank 2. That is, a cumulative weight measurement is performed. Immediately when an indication of starting the measurement is given by the measurement control unit 3, the stop valve 8 opens. Then, a positional command is transmitted from the measurement control unit 3 to the servo driver 6 so the the flow control valve 7 is set to a predetermined degree of opening. A valve port of the flow control valve 7 is set in a specified position by driving its servo motor, thereby controlling its degree of opening. As a result, a flow of the raw material is caused. Then, the raw material in the supply tank 1 begins to be transferred to the measurement tank 2.

The load cell of the tank 2 detects the weight of the thus transferred raw material and feeds back the value through the load cell amplifier 5 to the measurement control unit 3.

The measurement control unit 3 computes both a deviation between the target value and the measured weight value and also a time-variation of this deviation. It further arithmetically obtains a valve opening degree command (positional command) by which the flow velocity is set appropriately at the next control cycle under fuzzy control or optimum control or learning control. At the next control cycle, a new opening degree command (positional command) is issued to the flow control valve 7, thereby varying the flow velocity. A discussion of fuzzy control will be deferred until the end of this patent.

Figure 3:
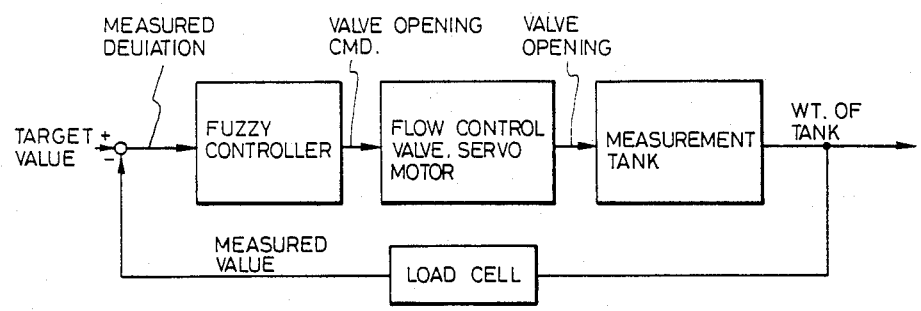
FIG. 3 is a control block diagram illustrating a control method according to the present invention.

As discussed above, the degree of opening of the flow control valve 7 is controlled in a closed loop (FIG. 3) at the prescribed control cycle on the basis of the observed quantity of the load cell 4. In consequence, the flow velocity is successively and separately controlled at every predetermined interval.

When the observed quantity is approximately equal to the target value, and when the measurement deviation decreases the flow control valve 7 closes its opening, resulting in a very small flow velocity. Hence, an inflow quantity after stopping the measurement diminishes, and the measuring accuracy is improved without being dependent upon the fluctuations in flow velocity that are caused by a disturbance of, for instance, a head difference.

In the measurement control unit 3 according to the present invention, the operation of the flow control valve 7 is changed to achieve the target value within a measuring range. The measurement can be conducted by the same measuring device irrespective of the magnitude of the target value, resulting in an expansion of the measuring range. This expansion should, however, be within a static accuracy of the detector. Besides, the operating pattern of the flow control valve 7 varies within the measuring time, and the measurement can be performed within the same short period of time regardless of the magnitude of the target value.

EXAMPLE 1

Figure 4:
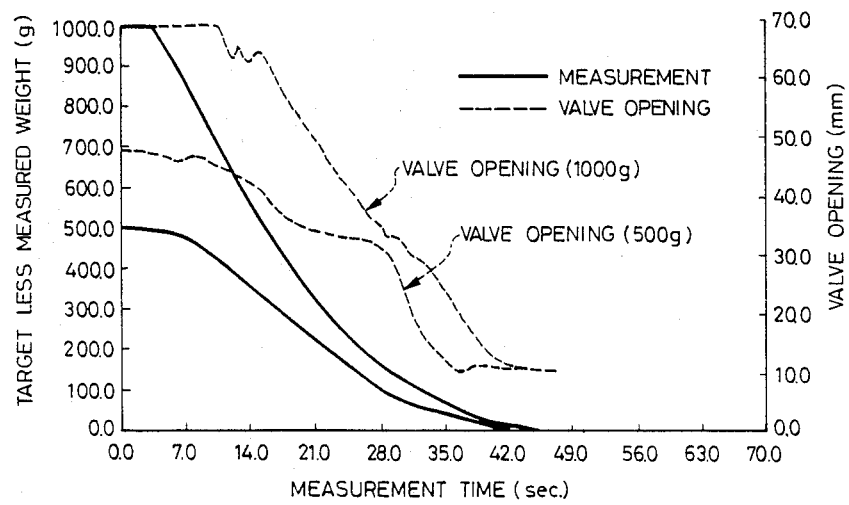
FIG. 4 is a measuring characteristic diagram showing results of an experiment conducted in accordance with the present invention.
Figures 5, 6:
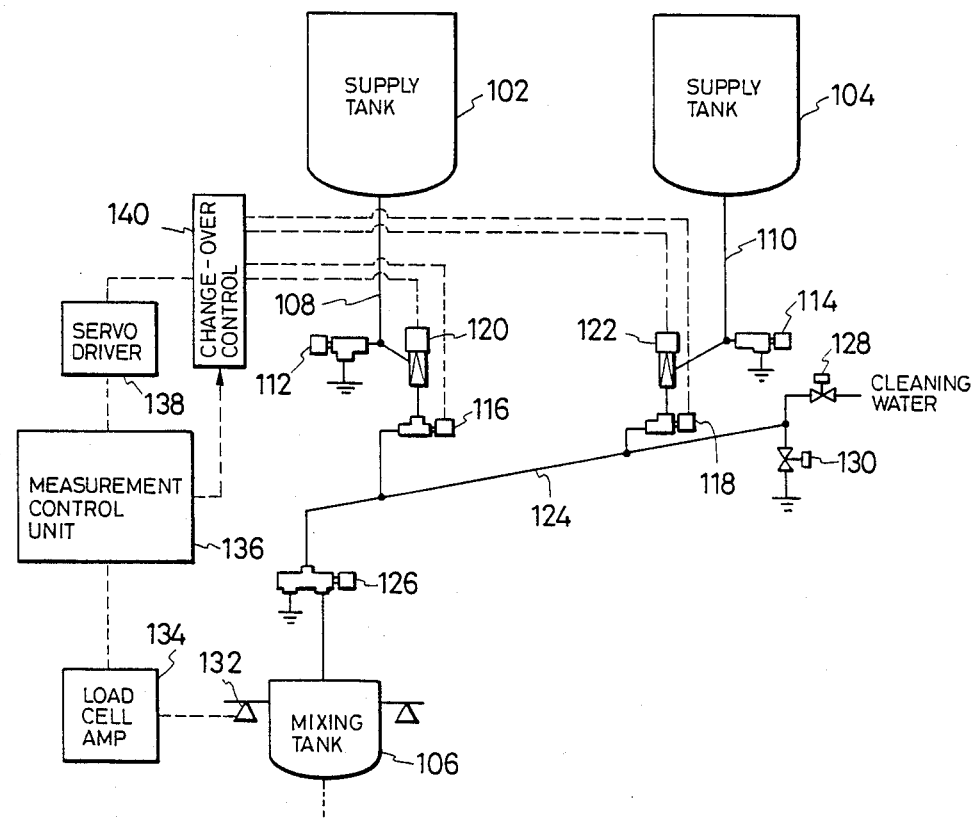
FIG. 5 is a table illustrating measurement characteristics.
FIG. 6 is a block diagram of a dual liquid measuring device, illustrating one embodiment of the present invention.

FIGS. 4 and 5 in combination show results of an experiment carried out for verifying the above-described phenomenon.

The measuring device on which these results were achieved is capable of performing 10 kg measurement at maximum, and the accuracy of the load cell is 0.02%. The flow control valve is positionally controlled by the servo motor, and the positional command is generated by the measurement control unit.

FIG. 4 illustrates measurement characteristics obtained when 500 g and 1000 g measurements are made by the same measuring device if a liquid of 1.2 kg is left in the upstream supply tank. The absicissa axis indicates the difference between the target and measured values and the degree of opening of the flow control valve, while the ordinate axis shows the measurement time. As is obvious from the figure, the measurement can be effected by the same measuring device irrespective of magnitude of the target value. Therefore, the measuring range is expanded. As a matter of course, a shift in valve opening differs, but it can be observed that the measuring time is almost the same irrespective of magnitude of the target value.

FIG. 5 shows the relation between the measurement accuracy and the measurement time with respect to the target value. Note that the measurement accuracy is obtained by measuring the outflowing liquid with another weight measuring device.

In the case of the 10 kg measurement, the measurement time amounts to approximately 130 sec., and the measurement accuracy is ±0.5 g. An accuracy of ±1.0% is obtained over a measuring range of 1:100.

The flow velocity varies according to the residual quantity of material remaining in the tank. However, even when initiating the measurement from a different level of residual material, the measuring accuracy and the measuring time do not change. It can be confirmed that there is no influence of fluctuations in flow velocity.

The above-described embodiment has exhibited a positive measuring system for measuring the liquid, that is, a system for measuring the liquid that has flown into the measurement tank 2. Also, the drain valve 9 and the cleaning/effluent valve 10 depicted in the figures are auxiliary valves used for cleaning and effluent. In accordance with the present invention, it will readily be assumed that instead of the positive measuring system a negative measuring system may be utilized for measuring the amount of outflowing liquid from the upstream supply tank by providing, as depicted with a broken line in FIG. 2, a detector in the supply tank 1. The detector may be a pressure-type in which the liquid level is measured by, for instance, a level gauge in addition to weight measurement by using a hopper and the measurement liquid level is fed back through a differential pressure transmitter amplifier to a measurement controller. Alternatively, it may be a capacity-type which employs an oval flow meter or other types.

A commonly used arrangement of the detector in the case of measuring the liquid is a combination of the flow control valve and the servo motor which are described in the foregoing embodiment. The present invention is not, however, necessarily confined to such an arrangement. On the other hand, in the measurement of a powder, a screw feeder, a damper and a gate substitute for the flow control valve.

As discussed above, the present invention provides the following effects.

(1) Highly accurate measurement can be attained without being subject to fluctuations in flow velocity which are caused by disturbances.

(2) The measurement can be performed over a wide range of target values.

(3) The measurement can be effected in a short time without being contingent upon the magnitude of the target value.

The system which makes use of the control unit according to the present invention brings about:

(1) a decrease in the number of measuring devices, and (2) a decrease in the loss of raw materials.

Hence, the following economical effects can be obtained:

(1) a decrease in the initial cost in association with the decrease in the number of measuring devices, (2) a reduction maintenance in association with the decrease in the number of devices, (3) a lower failure rate which is due to improved reliability in association with the drop in the number of devices, and (4) a reduction in operational cost which is attributed to the decreased loss of raw materials since the residual quantity (head difference) of raw materials exerts no influence because the flow velocity is controlled.

The preferred embodiments of the present invention will hereinafter be described in detail with reference to the accompanying drawings. First, a liquid mixer and then a powder measuring mixer will be described.

Referring to FIG. 6, there is illustrated a dual liquid measuring mixing system in one embodiment of the present invention. In this system, from two tanks 102 and 104 serving as the liquid receiving containers disposed on the upstream side stock liquids are supplied to a single tank 106 serving as the liquid receiving tank provided on the downstream side. The two liquids are intermixed after being, cumulatively measured in the liquid receiving tank 106.

Connected to the two supply tanks 102 and 104 on the upstream side are piping paths 108 and 110 in which drain valves (DRV) 112 and 114 and stop valves (SPV) 116 and 118 are provided. The drain valves 112 and 114 are placed in parallel with opening control valves (FCV) 120 and 122, respectively.

The above-described piping paths 108 and 110 are connected to a common connecting pipe 124 disposed downstream of the opening control valves 112 and 114 so that the liquids can be transferred through a cleaning-/effluent valve (CFV) 126 to the downstream mixing tank 106. Provided on the upstream side of the connecting pipe 124 are a cleaning initiating valve (CIV) 128 and an air removal valve (ADV) 130. Thereby a cleaning liquid can be introduced through the cleaning initiating valve 128 into the connecting pipe 124.

A load cell 132 acts as a detector for measuring a weight of the measured liquid and is installed to at least partially support the mixing tank 106 positioned on the downstream side. The load cell 132 is connected via a load cell amplifier 134 to a measurement control unit 136.

The measurement control unit 136 is connected through a servo driver 138 t a change-over device 140. Connected to the change-over controller 140 are the opening control valves 120 and 122 for the two liquid supplying systems and the stop valves 116 and 118. The change-over controller 140 selectively changes over its outputs to one of the two systems in response to a command from the measurement control unit 136.

Next, an operating procedure of the thus constructed liquid measuring mixer will hereafter be described.

Production conditions (pertaining to the measurement of liquids in the supply tanks 102 and 104) are input to the measurement control unit 136. The target value is set in the measurement control unit 136. Subsequent to this step the drain valves 112 and 114 and the cleaning/effluent valve 126 are changed over to a measuring configuration. Upon an indication of initiating the measurement, a positional command is transmitted from the measurement control unit 136 to the servo driver 138 so that the stop valve 116 of the first system is opened and its opening control valve 120 has a predetermined degree of opening. A valve port of the opening control valve 120 is set in a specified position by driving an associated servo motor and the opening degree is adjusted to cause a flow of the first stock liquid. In consequence of this, the stock liquid in the first supply tank 102 begins to be transferred to the mixing tank 106.

The load cell 132 of the mixing tank 106 detects the weight of the transferred stock liquid and then feeds back this value through the load cell amplifier 134 to the measurement control unit 136.

The measurement control unit 136 computes a deviation between the actual weight value that has thus been fed back and the target value and also computes a time-variation quantity of this deviation. The measurement control unit 136 arithmetically obtains a new opening degree command (positional command) by which an appropriate flow velocity is obtained at the next control cycle on the basis of any one of a fuzzy control system, an optimum control system and a learning control system. At the next control cycle, a new opening degree command is issued to the opening control valve 120, thereby changing the flow velocity.

As discussed above, the degree of opening of the opening control valve 120 is closed loop controlled at the specified control cycle on the basis of the quantity of transferred liquid detected by the load cell 132, whereby the flow velocity of the liquid is controlled.

When the measured deviation decreases, the opening control valve 120 contracts the opening, resulting in a measurably smaller flow velocity. When the measured deviation add the time-variation of the deviation diminish, and if the measurement deviation is less than a certain value the measurement is stopped. Then, the stop valve 116 is closed. Immediately, the opening control valve 120 is moved into a fully closed position. At this time, the flow velocity is extremely small, and the inflow quantity after closing is also very small. Hence the inflow quantity after the measurement has ceased is reduced while the measuring accuracy is improved without any dependence upon the fluctuations in flow velocity. Furthermore, the operation of the opening control valve 120 changes within a measurement range according to the target value or the process system and the measurement can be done by the same measuring device regardless of the magnitude of the target value, resulting in an expansion of the measurement range. However, this range expansion must be within the static accuracy of the weight detector. The operating pattern of the opening control valve 120 varies with the measuring time, and almost the same short-time measurement can be effected irrespective of the magnitude of the target value.

Subsequently, the process is changed over to the measurement of the liquid within the second supply tank 104. The change-over controller 140 changes over flow to the opening control valve 122 provided for the second supply tank 104. A target value for the second liquid is previously set, and the measurement is carried out by performing the same control as that described above in conformity with a measurement initiating command. The control function in the measurement control unit 136 is the same. An output signal is merely changed over to the stop valve 118 and the opening control valve 122 for the second system at the operating end by means of the change-over device 140.

The liquids are transferred via the shared connecting pipe 124 to the mixing tank 106. This connecting pipe 124 is arranged such that its diameter is made large to permit the residual liquid within the pipe to spontaneously drop down. Therefore, the length of this connecting pipe 124 is as short as possible in order to improve the measuring accuracy. However, if the connecting pipe 124 is not used, an alternative method is that individual pipe systems to the mixing tank 106 are provided. In this case, the amount of liquids to be intermixed is restricted because the size of the mixing tank 106 is limiting. In addition where a plurality of liquids are received, the pipe arrangement for separate paths is difficult, which is a problem in terms of fabricating the equipment. On the other hand, the separate paths are advantageous for measurement with super-high accuracy in which the residual quantity in tee connecting pipe becomes a factor.

The liquid measuring mixer according to the present invention is one example of positive type liquid measurement, that is, a system for measuring the liquid transformed to the mixing tank 106. In FIG. 6, the drain valves 112 and 114, the cleaning/effluent valve 126, cleaning initiating valve 128 and the air removal valve 130 are auxiliary valves for cleaning and effluent.

When measuring the liquid, for instance, from the first supply tank 102, the cleaning associated with the second drain valve 114 is carried out. Then, the liquid in the second supply tank 104 is measured. In the case of cleaning the connecting pipe 124 alone, after finishing the measurement of the liquid from the first supply tank 102, the cleaning/effluent valve 126 is changed over to its effluent-side, while the cleaning initiating valve 128 is opened for cleaning. At this time, the air removal valve 130 as well as the stop valves 116 and 118 remain closed. After cleaning has been effected for a predetermined period, the cleaning initiating valve 128 is closed, while the air removal valve 130 is opened. Subsequently the air removal valve 130 is closed. The measurement will then proceed to the second supply tank 104.

There will now be shown results of measurements performed on the basis of the above-mentioned process by use of the device depicted in FIG. 6.

The measuring device which has yielded these results is capable of performing 10 kg measurements at maximum. The accuracy of the load cell is 1/5000. The opening control valve is positionally controlled by a servo motor, and a positional command is outputted from the measurement control unit.

EXAMPLE 2

Figure 7:
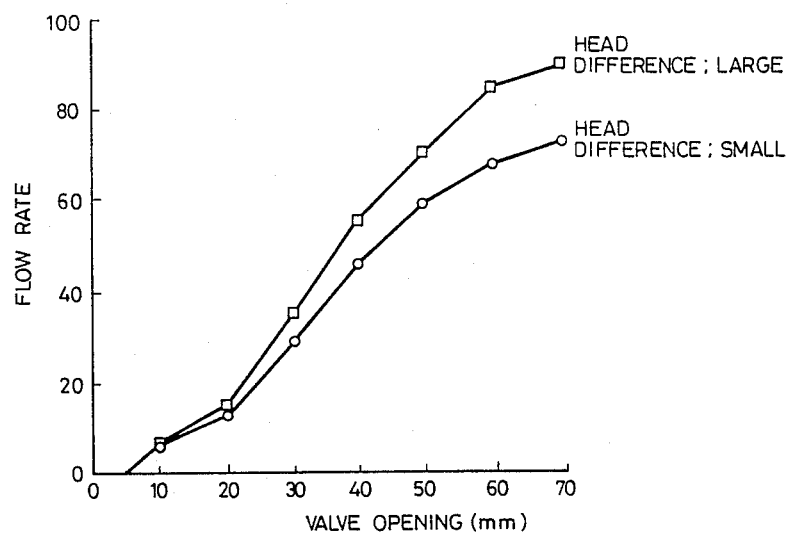
FIGS. 7 and 8 are flow-rate characteristic diagrams of valves applied to an experimental measurement which is conducted by employing the device depicted in FIG. 6.
Figure 8:
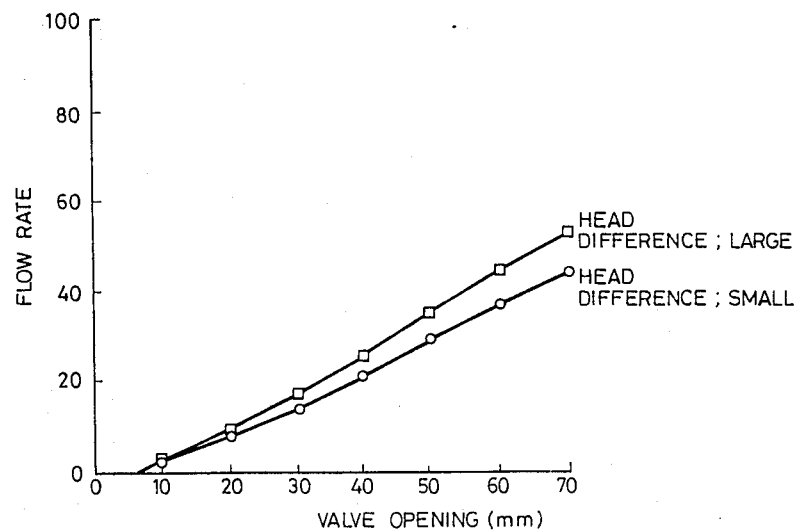

In FIGS. 7 and 8, there are illustrated flow-rate characteristics for two types of opening control valves. These two kinds of opening control valves were alternately installed in the system depicted in FIG. 6, but the measurement was conducted without otherwise changing the control system and so forth.

Figure 9:
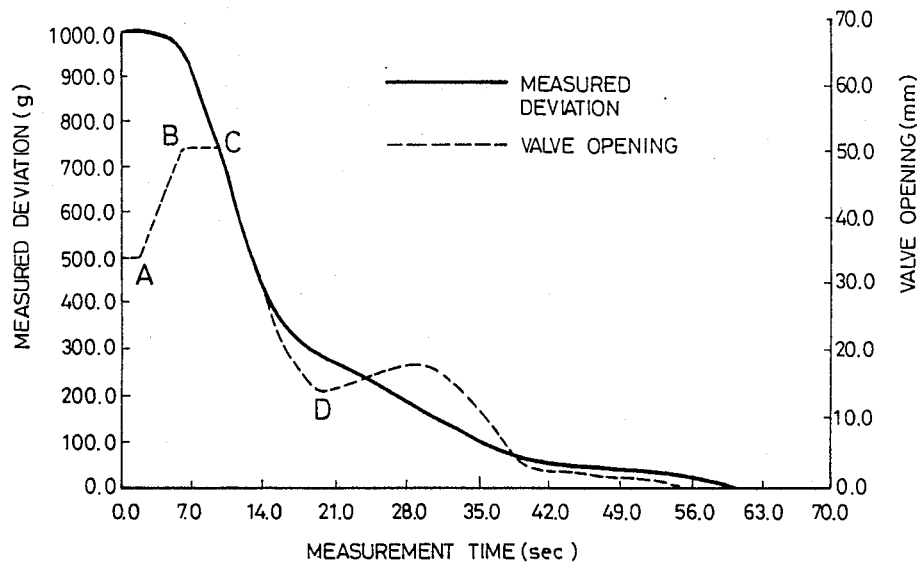
FIGS. 9 and 10 are diagrams, which correspond to FIGS. 7 and 8, showing measurement results of the experiment.
Figure 10:
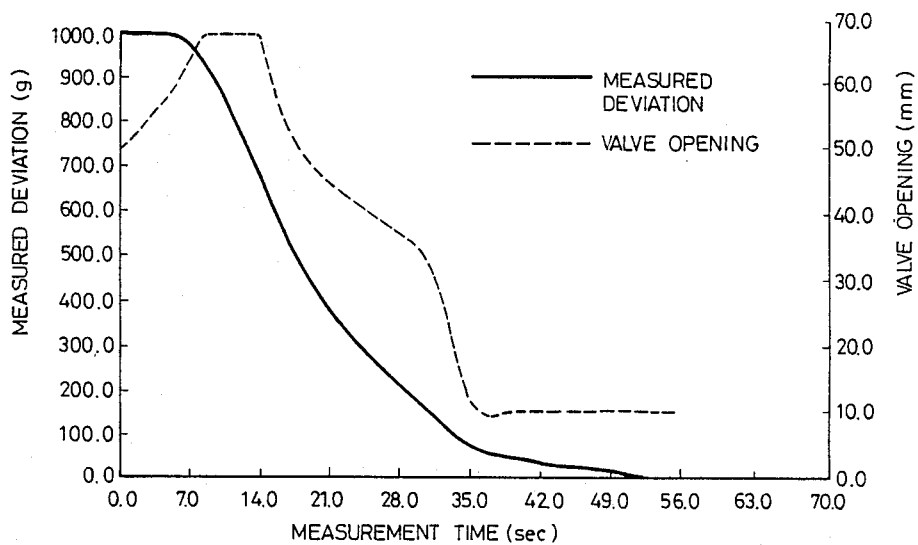

FIGS. 9 and 10 in combination show the results of the 1000 g measurement. FIG. 9 illustrates the results of the opening control valve having the flow-rate characteristics of FIG. 7, and FIG. 10 shows the results of FIG. 8.

As is apparent from FIGS. 9 and 10, the operating pattern of the degree of opening of the opening control valve, as a matter of course, varies. A highly accurate measurement can be attained during almost the same period regardless of the choice of opening control valve.

According to experiments conducted with this system, homogeneous liquids were employed, and some effects produced in connection with differences of liquid properties were evaluated. These property differences caused the flow-rate characteristics of the opening control valves to be different from each other. Moreover, another experiment was conducted by changing the amount of liquid reserved in the supply tank. As a result, it was confirmed that high precision measurement can be carried out within a short period of time over a wide range simply by changing over the predetermined opening control valve and the stop valve as well.

In this measuring system, as is illustrated by the flow rates of FIGS. 7 and 8, even if the degree of opening is the same, the flow-rate, i.e., the flow velocity, according to the residual quantity of liquid, differs. When the liquid is measured at each level of the residual quantity, however, the same results with respect to the measuring time and the measuring accuracy are obtained, although the operating pattern of the opening control valve, as a matter of course, varies. Concerning the measuring range, an accuracy within ±1.0 g is assured within a measuring range of 1:100.

In the embodiment explained above, the description has emphasized the case where two kinds of liquids are measured and mixed. In this invention there may be a large number of liquids measured in the same liquid receiving container. However, the number of opening control valves controlled by the same measuring device is preferably 8 or thereabouts.

Next, the most typical mode of the present invention will be explained.

Figure 11:
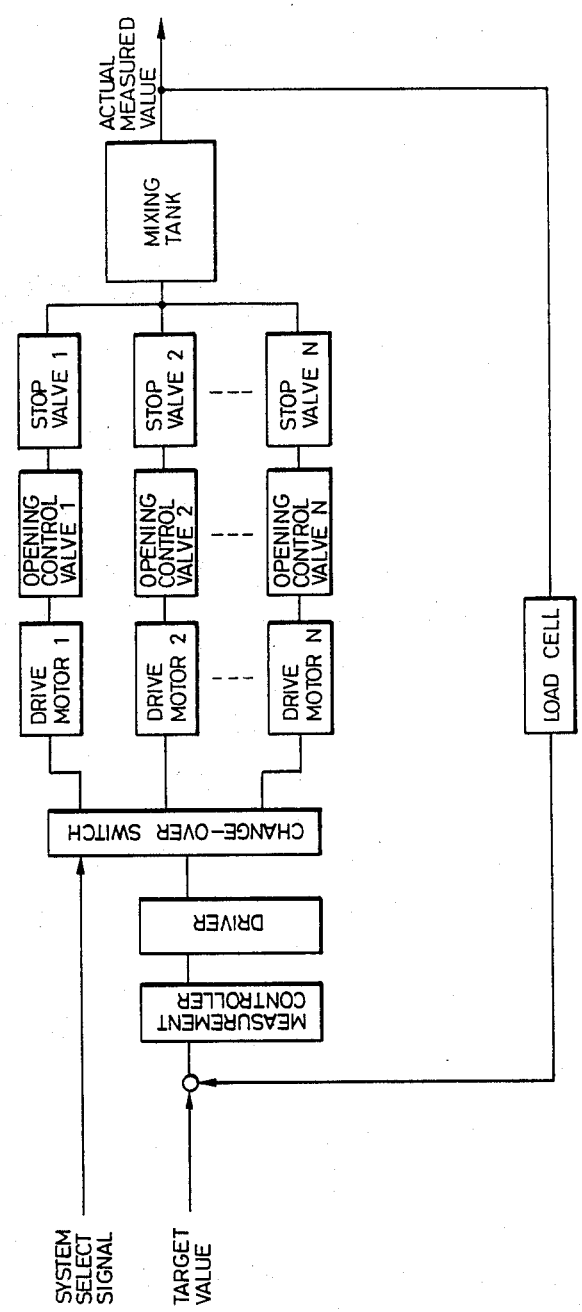
FIG. 11 is a control block diagram illustrating a multiple liquid measuring mixer according to the present invention.

FIG. 11 is a control block diagram of the device applied to the cumulative measurement of multiple liquids. This device has N stop values and N opening control valves attached to N supply tanks. The respective valves of a system selected by the change-over device are opened and closed by a driving motor actuated in response to commands of the measurement control unit and a driving controller. The actual weighed values of individual liquids that are subjected to the cumulative measurement are measured, and these actual values are fed back to the measurement controller.

As a variant form of the present invention, the positive measuring system for effecting the measurement by providing the detector in the liquid receiving container may be replaced with the negative measuring system which measures the amount of flowing liquid by providing the weight detector in the supply container.

Figure 12:
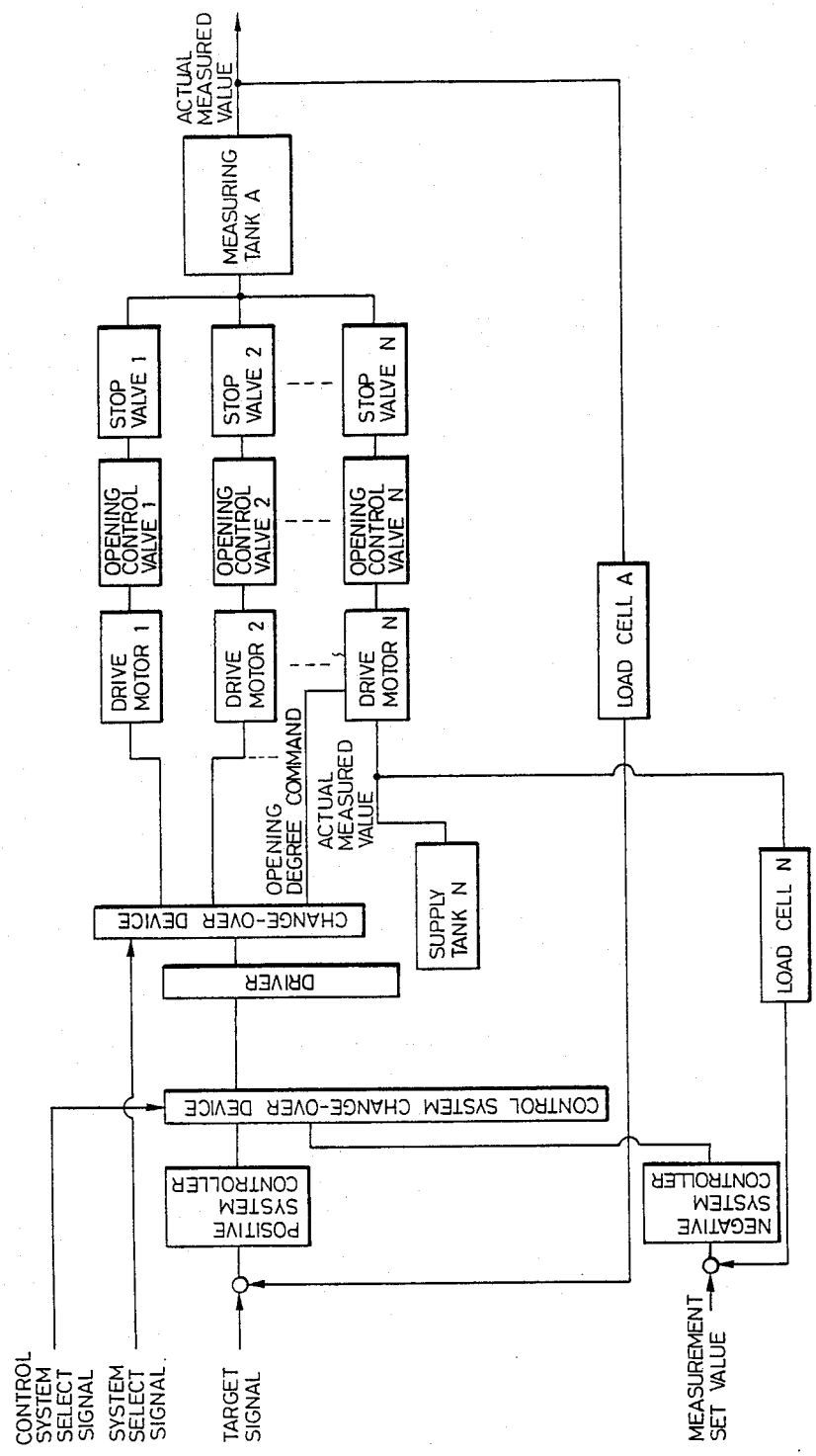
FIG. 12 is a control block diagram illustrating a variant form of the present invention for a liquid mixer.

In FIG. 12, there is illustrated a control block diagram of the above-described variant form of the present invention. In the figure a tank N is identified as the supply tank N. The quantity of the liquid filling the supply tank N which flows out therefrom is measured by a load cell N attached to the supply tank N. The measured liquid is then transferred to the liquid receiving container serving as a measuring tank A, in which place the liquid is to be cumulatively measured. The two values obtained both by the negative measurement of the load cell N and by the cumulative measurement of load cell A are fed back to the respective negative and positive measurement controller. Each measurement controller computes a deviation between the measured value and the separately set target value and also computes a time-variation of the deviation. It thereby outputs an opening command under a fuzzy control system or the like. Outputs of the two measurement controllers are changed over by the control system change-over device, and the driving controller is thereby controlled.

Based on the above-described constitution, for instance, a very small measurement is performed by the negative measuring system, while a measurement including a large target value is executed by the positive measuring system. With this arrangement, it is feasible to effect the measurement over a still wider range.

Additionally, in the production system for mixing a solution, the measuring tank may be equipped with a stirrer, a hot water circulating device, etc., as supplementary devices. The measuring tank is defined as a control tank, and the measurement, and mixing and reactive processes can, therefore, be performed in the same container.

In the above-mentioned embodiment, the load cell has been described as the detecting device for the measurement. Other detectors may, however, be applicable. For example, the detector may be a pressure detector such as a differential pressure sensor or a variety of level gauges. It is to be noted that the measuring accuracy differs depending on the static accuracy of the detector.

In the embodiment given above, the driving device for the opening control valve involves the use of the servo motor. However, any kind of devices capable of effecting positional control of the valve may be employed.

The preferred embodiment of the powder measuring mixer of the present invention will now be described with reference to the accompanying drawings.

Figure 13:
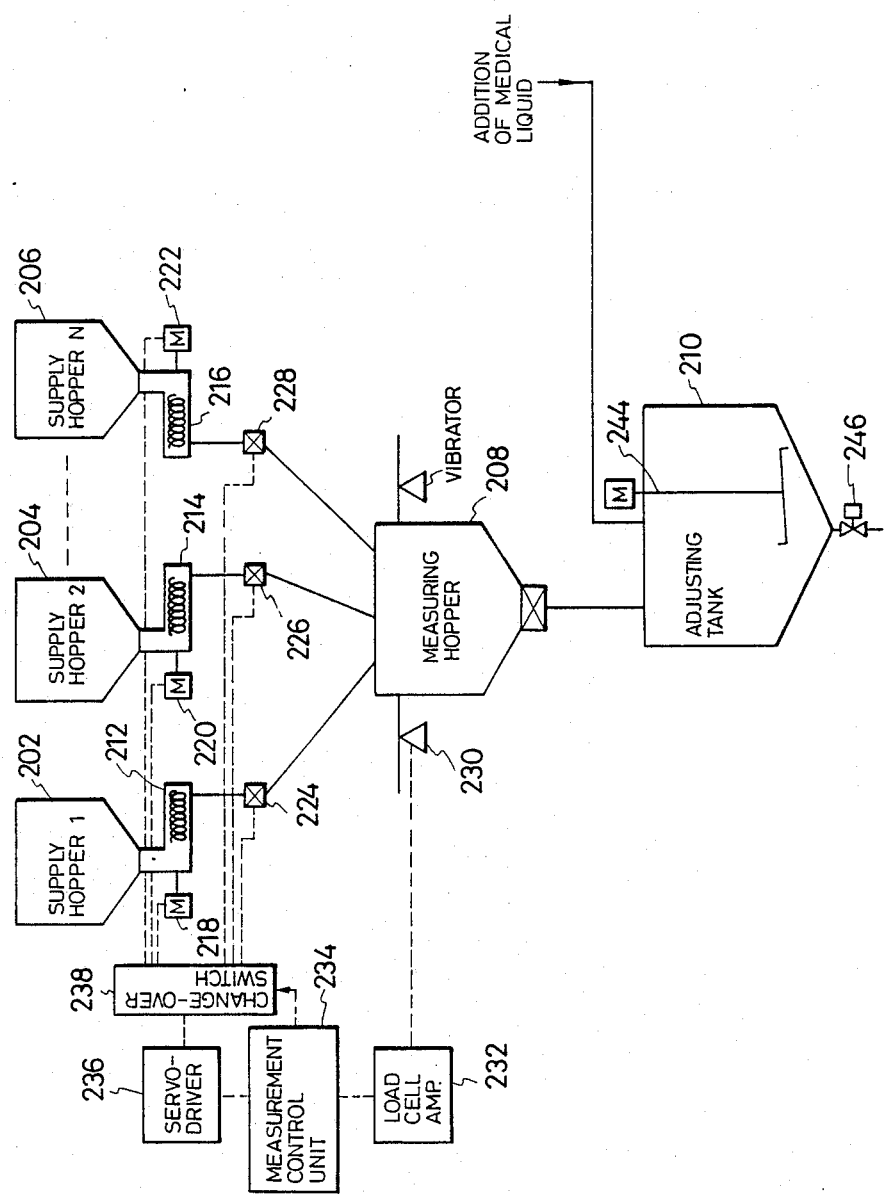
FIG. 13 is a block diagram of a multiple powder body measuring mixer, illustrating one embodiment of the present invention.

FIG. 13 illustrates a measuring mixer for mixing N kinds of powder. In this embodiment, N supply hoppers 202, 204 and 206 serving as supply containers are provided on the upstream side and are charged with raw materials in powder form. From these hoppers 202, 204 and 206, the different powders are supplied to a measuring hopper 208 which receives the powders and is disposed on the downstream side. The description will be focussed on a case where the powder mix of the N types of powder is transferred to an adjusting tank 210 after being cumulatively weighed.

Outlets of the supply hoppers 202. 204 and 206 are connected to screw feeders 212, 214 and 216 driven by respective servo motors 218, 220 and 222. The outlets of the screw feeders are gated by shutter gates 224, 226 and 228 and their gate outputs are transported via pipes to the measuring hopper 208.

The measuring hopper 208 is provided with a load cell 230 serving as a detector for the purpose of measuring the weights of the powders transferred from the supply hoppers 202, 204 and 206. The load cell 230 is connected through a load cell amplifier 232 to a measurement control unit 234. The measurement control unit 234 is connected through a servo driver 236 to a change-over switch 238.

The change-over switch 238 is changed over in accordance with a command issued from the measurement control unit 234 and serves to select any one of multiple powder supplying systems. The change-over switch 238 is provided to direct both an opening/closing command from the measurement control unit 234 to the corresponding shutter gate 224 226 or 228 and a driving command from the servo driver 236 to a predetermined motor 218, 220 or 222.

The measuring hopper 208 is connected through a discharge gate 240 to the adjusting tank 210. The measuring hopper 208 is also equipped with supplementary devices such as a vibrator 242 and an air knocker with the intention of eliminating the residual powder from the measuring hopper 208. The adjusting tank 210 incorporates a stirrer 242 and has a foot valve 244 disposed at its outlet.

Figure 14:
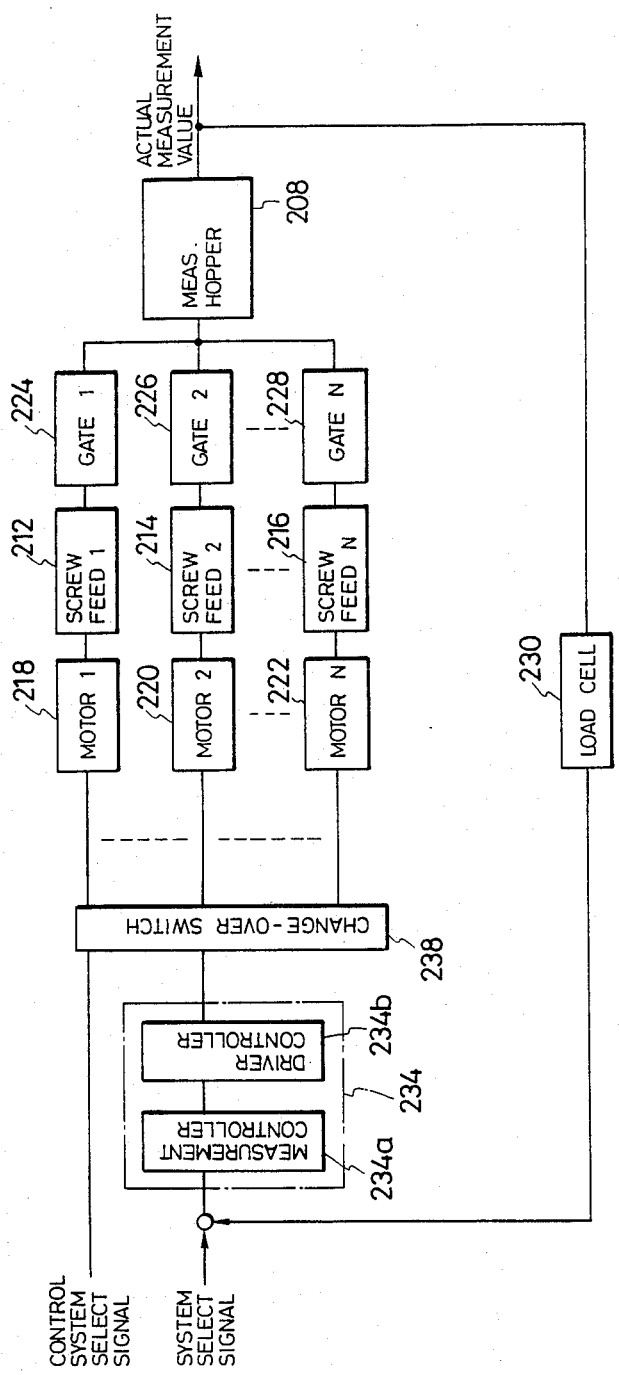
FIG. 14 is a control block diagram illustrating the measuring mixer depicted in FIG. 13.

Next a powder measurement mixing process by the thus constructed powder measuring mixer will be explained in conjunction with a control block diagram of FIG. 14.

The process starts with designating supply hoppers as mixing sources and the measuring/mixing conditions such as the order of measurements of the designated supply hoppers. These designations are supplied to a measurement controller 234a incorporated in the measurement control unit 234.

Immediately after setting a target value in the measurement control unit 234, a command to initiate the measurement is given. Immediately thereafter the shutter gate 224, 226 or 228 of the supply hopper 202, 204 or 206 of the supply system selected by the change-over device 238 opens. Then, a rotational frequency command is transmitted from a driving controller 234b of the measurement control unit 234 to the servo driver 236, with the result that the selected screw feeder 212, 214 or 216 transfers the powder at the predetermined rotational frequency. The screw feeder 212, 214 or 216 is rotated at the specified rotational frequency by actuating the selected servo motor 218, 220 or 222 to cause a flow of stock powder. As a result, the raw material in the selected supply hopper 202, 204 or 206 begins to be transferred to the measuring hopper 208.

The load cell 230 of the measuring hopper 208 detects a weight of the thus transferred raw powder material, and then feeds back this value via the load cell amplifier 232 to the measurement controller 234a.

The measurement controller 234a computes both a deviation between an actual weight value that has now been fed back to it and a set value and also a time-variation value of the deviation. It further arithmetically obtains an opening degree command (positional command) by which the flow velocity becomes appropriate at the next cycle on the basis of any one of a fuzzy control system, an optimum control system and a learning control system. At the next control cycle, the driver controller 234b gives an indication of the proper rotational frequency to the screw feeder 212, 214 or 216 to change the flow velocity.

As discussed above, the rotational frequency of the screw feeder 212, 214 or 26 is controlled by the closed loop with the predetermined control cycle on the basis of the observed quantity of the load cell 230, thus controlling the flow velocity.

The rotational frequency of the screw feeder 212, 214 or 216 is decreased with a reduction in measured deviation. Thereby the flow velocity approaches a very small quantity. When the measured deviation and the time-variation of the deviation are reduced, and if the measured deviation decreases below a certain value, the measurement is stopped. First, the shutter gate 224, 226 or 228 is closed. The rotational frequency of the screw feeder 212, 214 or 216 is reduced to zero thus halting the feeding. At this time, the quantity flowing in is extremely small. Therefore, the inflow quantity after stopping the measurement is decreased and the measuring accuracy is improved with no dependence on the fluctuations in flow velocity. Moreover, the operation of the screw feeder is made dependent upon the target value and the processing system as long as the measurement is performed within the measuring range. The measurement can be done by the same measuring device irrespective of the magnitude of the target value, resulting in an expansion of the measuring range. However, this range of expansion must take into account the static range of the weight detector.

As a function of the measuring time, the operating pattern of the screw feeder varies. However, almost the same short duration measurement can be performed regardless of the magnitude of the target value.

The next measurement will proceed for the powder in the similarly selected hopper 202, 204 or 206. The change-over switch 238 is changed over to the selected screw feeder 212, 214 or 216 associated with the selected hopper 202 204 or 206. The target value for that powder is previously set, and the measurement is effected under the control similar to that described above in conformity with a measurement initiating command. That is, the control functions performed in the control unit 234 are the same, but the output signals to the selected shutter gate 224, 226 or 228 and to the selected screw feeder 212, 214 or 216 are changed over by use of the change-over switch 238.

Upon termination of the cumulative weight measurement of multiple powders in the measuring hopper 208, the discharge gate 240 of the measuring hopper 208 opens to introduce the measured powders into the adjusting tank 244. During the discharge from the measuring hipper 208, the supplementary devices such as the vibrator 242 insure a thorough discharge. In the adjusting tank 244, a predetermined amount of medical liquid is added and the stirrer 210 is driven to mix the powder and liquid. When the stirring is finished, the foot valve 246 opens to discharge the mixed powder.

EXAMPLE 3

Results of an experiment made in accordance with the powder measuring mixer of the present invention will be explained. This experiment was conducted in the measuring device depicted in FIG. 13 by a system wherein two supply hoppers were used but no adjusting tank was provided.

The load cell used as the measuring device in this experiment was capable of performing a 5 kg measurement at maximum and had an accuracy of 1/2500. The rotational frequency of the screw feeder was controlled by an inverter motor, and a rotational frequency command (voltage output) was outputted from the measurement control unit.

Figure 15:
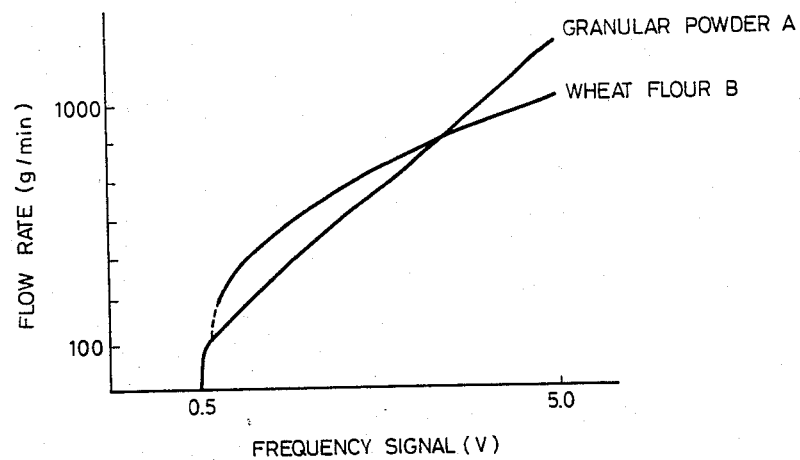
FIG. 15 is a flow-rate characteristic diagram when employing a screw feeder for two kinds of powders.

FIG. 15 shows the mean value of the flow-rate as a function of individual inverter input voltages (the rotational frequency) for two kinds of powders. Powder A was granular and its apparent specific gravity was approximately 0.5. On the other hand, powder B was similar to wheat flour having high adhesion, and its apparent specific gravity was about 0.5. These two kinds of powders were sequentially measured in the system depicted in FIG. 13 with no change in the control system. More specifically, the granular powder A was put into the supply hopper 202 while the wheat flour B was put into the supply hopper 204. Then, the powders A and B were sequentially measured by changing over the change-over device 19 with the same control unit 234.

Figure 16:
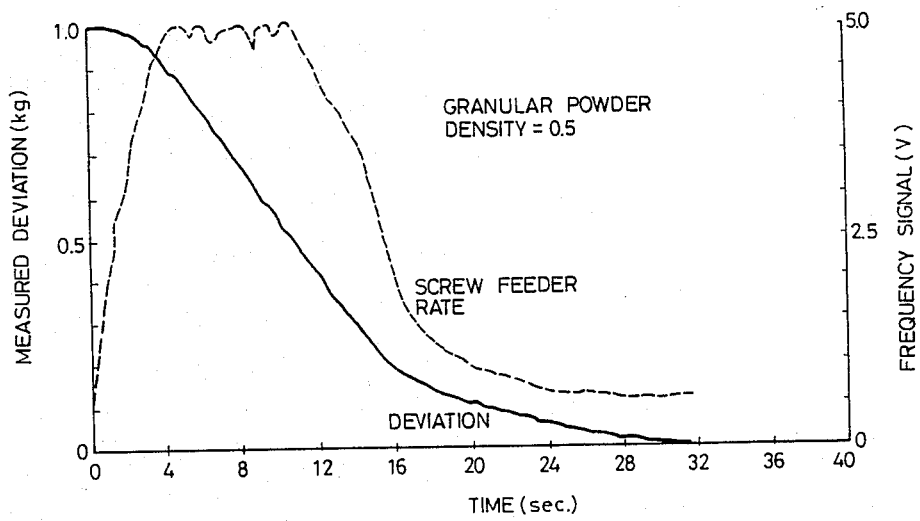
FIGS. 16 to 18 are flow-rate characteristic diagrams illustrating results of experiments conducted in accordance with the present invention for powders.
Figure 17:
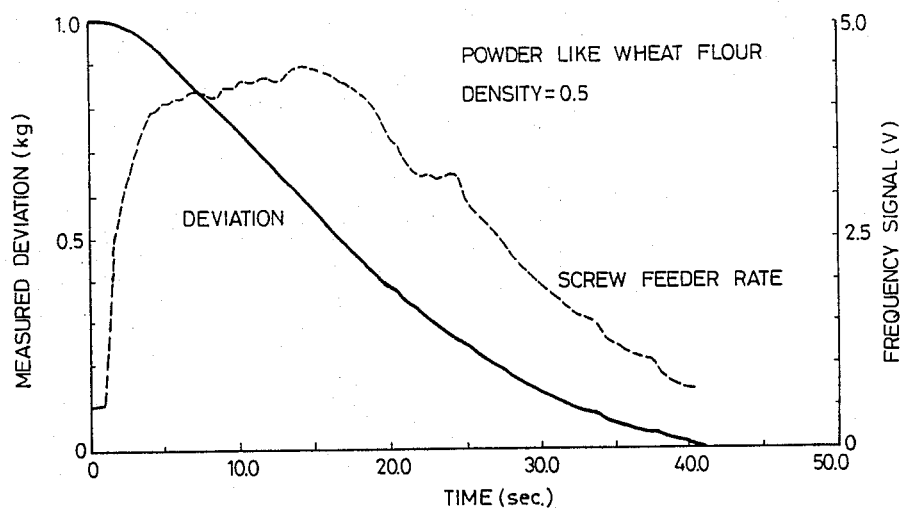

FIG. 16 illustrates the results of a 1 kg measurement of the granular powder A while FIG. 17 shows results of a 1 kg measurement of the flour-like powder B. As is obvious from FIGS. 16 and 17, the operating patterns of rotation of the screw feeder distinctly vary between the two cases but highly precise measurement results were obtained within almost the same measuring time.

The supply hopper may be vibrated in order to compress the stored powder and its fluidity is thereby changed. Its flow rate characteristics are also thus changed. However, although the operating pattern of the screw feeder varies, the same results are acquired both in the measuring time and in the measuring accuracy.

Figure 18:
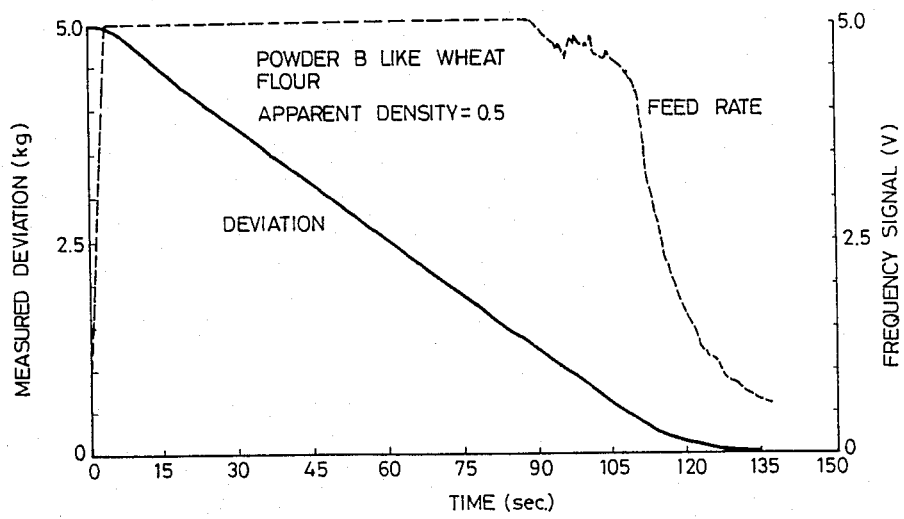

Table 1 shows the relation between the measuring time and the measuring accuracy with respect to the target value. Note that the measuring accuracy was obtained by measuring the powder that has left the supply hoppers with another inspection scale. In the 5 kg measurement, the measuring time was increased because of a restriction in the maximum rotational frequency of the inverter motor employed for this experimental system. However, the measuring accuracy was maintained at ±2 g. If the capability of this inverter motor were to be enhanced, the measuring time could be reduced. FIG. 18 illustrates the results of the 5 kg measurement for the flour-like powder B. As is apparent from the figure, the powder initially flowed out at the maximum feed rate or rotational frequency. If this outflow velocity would be increased, the measuring time could be further decreased.

TABLE 1

| | Powder A n = 3 | | Powder B n = 3 | |
|---|---|---|---|---|
| Target value | Error | Measuring time | Error | Measuring time |
| 5 kg | 2 g | 116 sec | 2 g | 145 sec |
| 1 kg | 2 g | 32 | 2 g | 48 |
| 500 g | 2 g | 28 | 1 g | 38 |
| 100 g | 2 g | 39 | 0 g | 54 |
| 50 g | 2 g | 27 | 2 g | 30 |

In this experimental system, a load cell having an accuracy of 1/2500 was used. In the case of the 10 g measurement, the accuracy was found to be ±2 g, which is equal to the static load accuracy of the load cell. Therefore, when employing a load cell having an accuracy of 1/5000, it can be understood that an accuracy of 1.0% is obtainable within a measuring range of 1:100. In this experimental system, an inverter motor was used and its range of rotational frequency (a ratio of the minimum to the maximum rotational frequency) was 1:10. If this type of motor is replaced with a servo motor, an even wider range of rotational frequency is obtainable and a measurement having a still higher accuracy is practicable in the same measuring time within the measuring range of 1:100.

In the above-described embodiment, the case where N kinds of powders are cumulatively measured by the single measuring hopper has been explained. The number of kinds of powders to be measured are not limited. An optimum number of screw feeders controlled by the same control unit is approximately 8 in view of system consideration.

Figure 19:
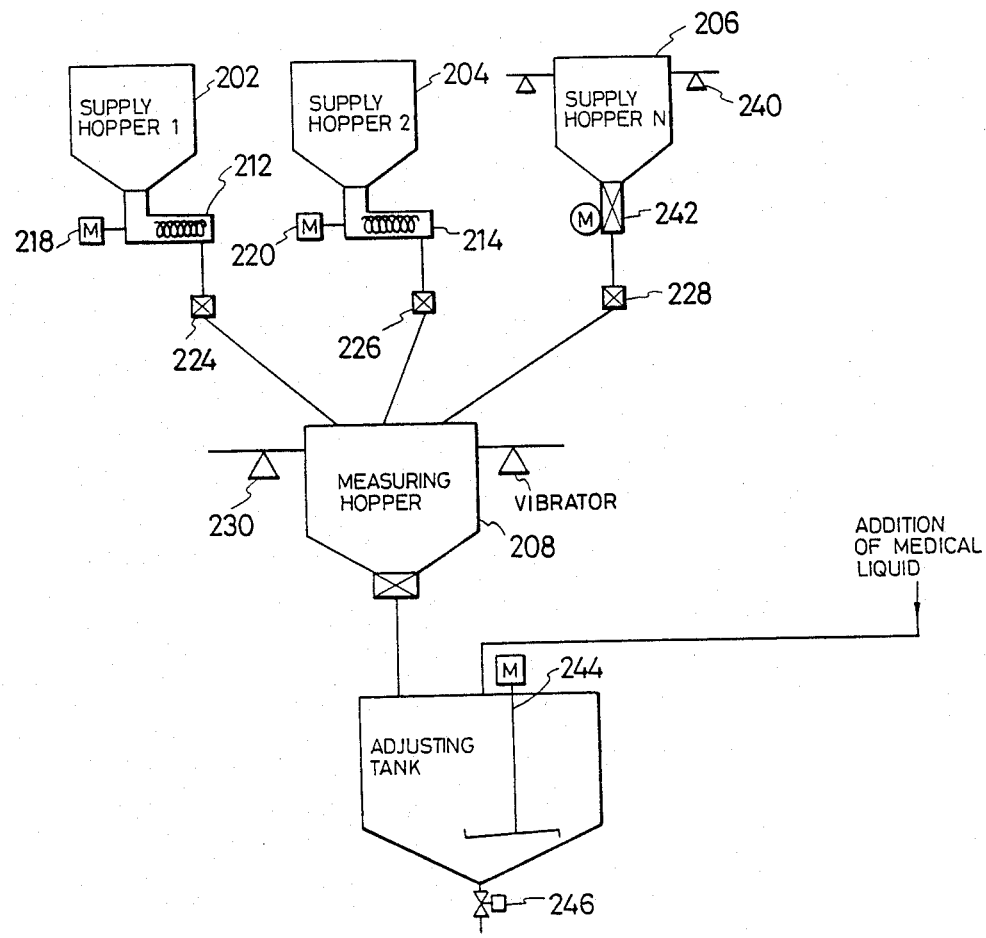
FIG. 19 is a block diagram of the powder measuring mixer, illustrating a variant form of the present invention.

FIG. 19 depicts a variant form of the present invention for a measuring powder mixer. This variant form is arranged in such a way that a positive measuring system for performing the measurement by providing the detector in the powder receiving hopper described in the previous embodiment is combined with a negative measuring system for measuring the amount of powder flowing from one of the supply hoppers by separately providing a detector in the supply hopper.

The supply hoppers 202, 204 and 206, the powder supplying system and the measurement mixing system have the same construction as those described in the preceding embodiment. Like components are marked with the same reference numeral and their description is, therefore, omitted. In this example the N-th supply hopper 206 is disposed in close proximity to a load cell 240 by which the amount of the powder flowing form the N-th hopper 206 is measured. An opening damper 242 is provided at an outlet of the N-th hopper 206 and the outflowing quantity of powder is controlled by adjusting an opening degree of the damper 242. It is to be noted that in FIG. 19, the opening damper 242 is indicated as the operational end of the negative measurement system but other screw feeders or the like are usable.

Figure 20:
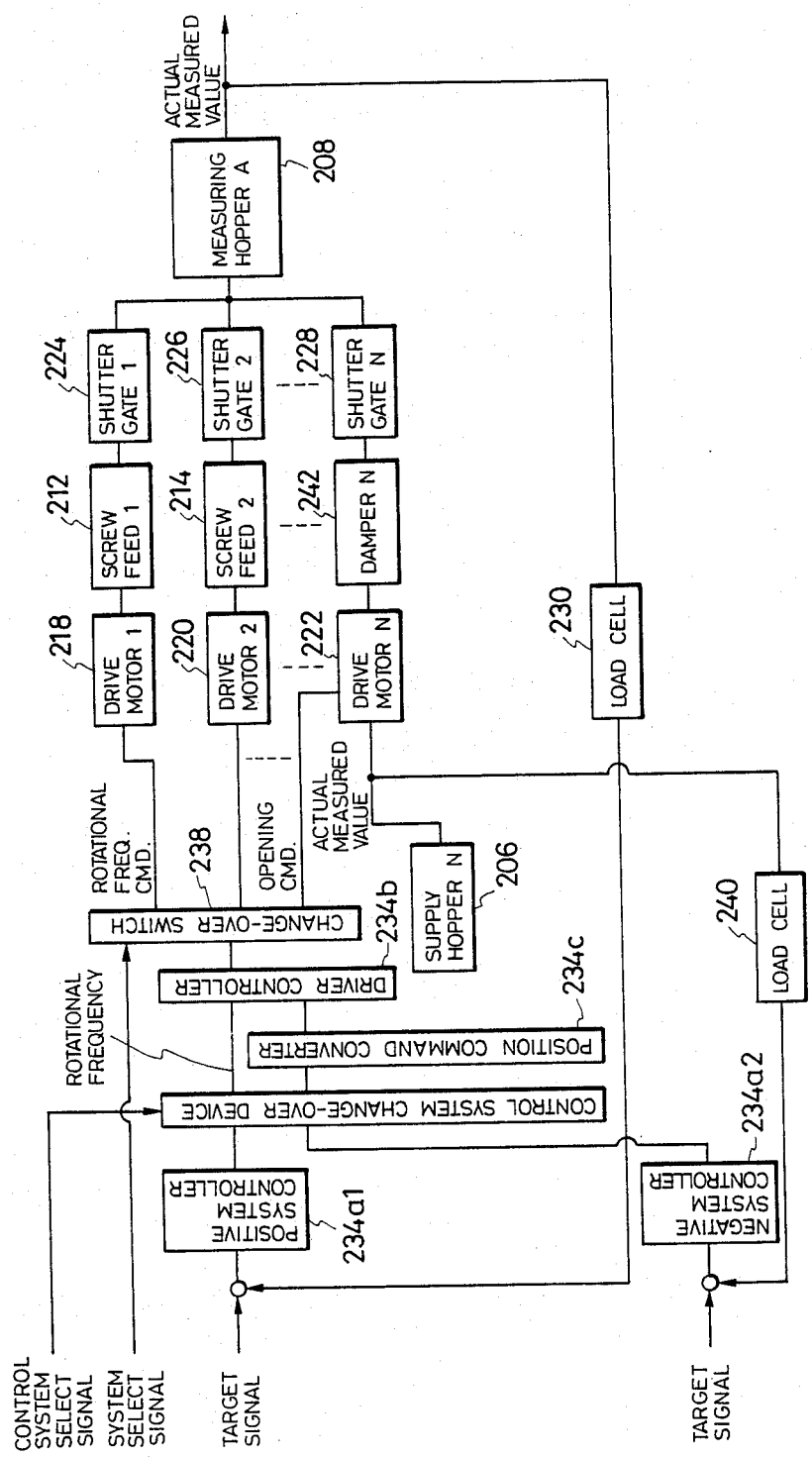
FIG. 20 is a control block diagram illustrating the measuring device depicted in FIG. 19.

FIG. 20 is a control block illustrating the aforementioned variant form of measuring powder mixer of the present invention. The description will be given in connection with the N-th supply hopper 206. It is noted that the powder system of FIG. 20 closely resembles the liquid system of FIG. 12. The outflowing quantity of powder filling the N-th supply hopper 206 is measured by subtraction with the load cell 230. The powder is then transferred to the measuring hopper 208, at which time the powder is cumulatively measured together with the already transferred powders from the first through (N−1)-th supply hoppers. In this way, the actual measured values obtained by the negative measuring system and by the cumulative measuring system are fed back to a corresponding negative system measurement controller 234a2 and a positive system measurement controller 234a1, respectively. The measurement controllers 234a1 and 234a2 each compute a deviation between the target value and the actual measured value and also a time-variation of the deviation. Subsequent to this step, the rotational frequency of the screw feeder 212 or 214 and the degree of opening of the opening damper 242 which has been converted by a positional command converter 234c are imparted to the driver controller 234b under fuzzy control or learning control or optimum control. The change-over between the selected powder supply systems is effected by the change-over switch 238.

Based on the above-mentioned construction, a very small measurement can be performed by, for instance, the negative measurement system, while the measurements involving a large target value is effected by the positive measuring system involving a cumulative weight. In consequence, the measurement can be done over a still wider range.

A movable adjusting tank may be used in a modified example of the present invention. With such an adjusting tank, a plurality of medical liquids can be potentially supplied to the adjusting tank when performing the stirring and reactive processes, but a single desired liquid can be supplied through a simplified piping system by moving the adjusting tank beneath the corresponding liquid discharge gate.

In the above-described embodiment depicted in FIG. 13, a load cell has been used as the detecting device. However, other detectors are usable, e.g., various kinds of level gauges. Note that the measuring range differs depending upon the static accuracy of the detecting device.

In a batch production system, when employing a multiplicity of medical liquids or of powders, their properties are different from each other. Hence, in the great majority of cases, the cumulative measurement cannot be done in the same container.

Figure 21:
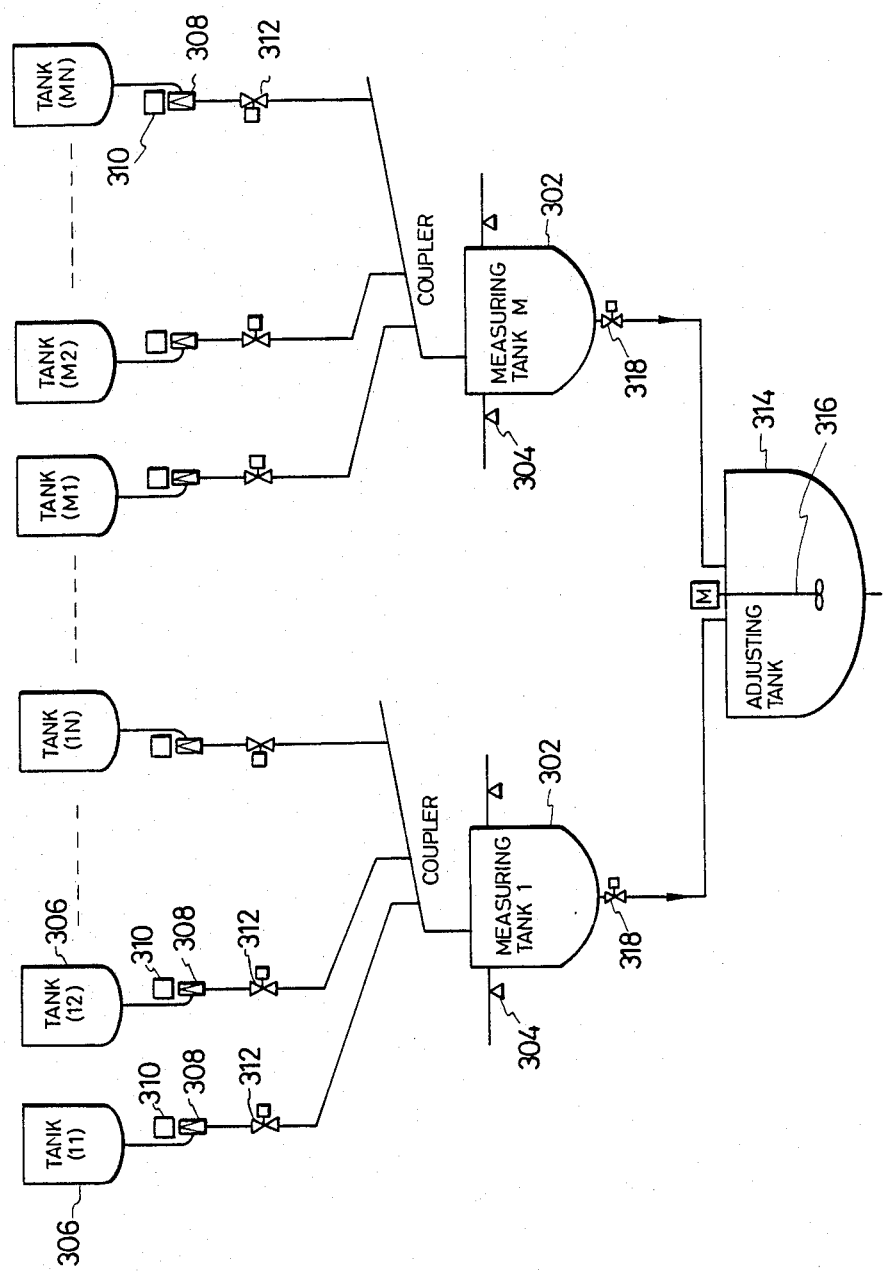
FIG. 21 is a block diagram showing one example of a liquid measuring mixer.

The production system for a liquid mixer is, therefore, arranged such that a plurality of liquid receiving tanks 302 depicted in FIG. 21 are provided, each receiving tank having an associated load cell 304. Stock liquids are supplied from tanks 306 through opening control valves 308 driven by motors 310 and through stop valves 312. Those liquids, mixable with each other, are measured into the same tank 302 while unmixable liquids are put into other separate measuring tanks 302. This arrangement needs an adjusting tank 314 with a stirrer 316, disposed on the downstream side of the measuring tanks 302 with foot valves 318 therebetween, for reactive and adjusting processes.

Figure 22:
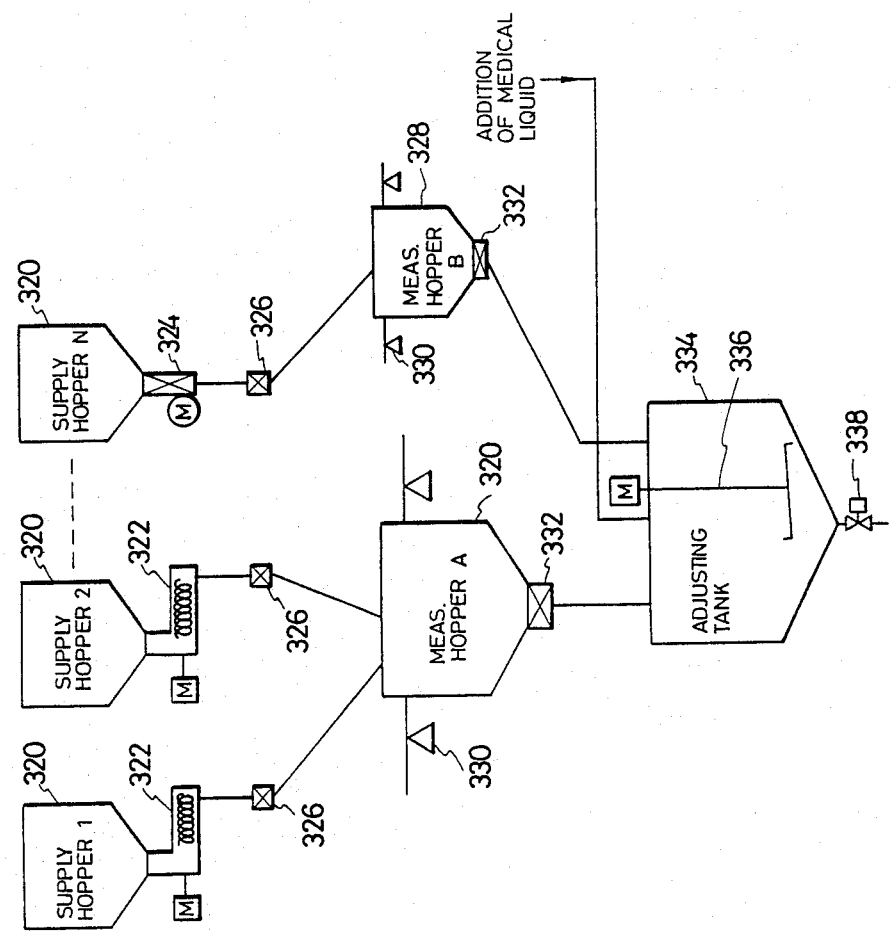
FIG. 22 illustrates one example of a fixed powder measuring mixer.

A similar measuring mixer for powders is illustrated in FIG. 22. A plurality of supply hoppers 320 supply different types of powders through motor-driven variable-speed screw feeders 322 or a motor-driven damper 324 having controllable degrees of opening. Stop gates 326 positively shut off powder flow. Multiple measuring hoppers 328 receive those respective powders which are mixable with each other. Load cells 330 measure the weights of the respective measuring hoppers 328. Discharge gates 332 at the outlets of the measuring hoppers 328 release the mixed powder to an adjusting hopper 334, which also receives a liquid. A stirrer 336 mixes the contents of the adjusting tank 334 which are then discharged through a foot valve 338.

A production system in which the adjusting tank or hopper is mechanically fixed should have equipment according to the classification of liquids or powder. Especially, to achieve highly accurate measurement, as explained earlier, requires a multiplicity of measuring tanks or hoppers, as well as the adjusting tank or hopper and supplementary appliances such as pipe measuring devices, control units and auxiliary valves. In this case, some components of the system are used, but some are not employed depending on the kind of liquids or powders to be mixed. It follows that such a system creates much duplication, thereby increasing initial costs of the equipment. There has increasingly been a demand for multi-purpose production system. In the fixed type production system however, the piping system has to be modified. Changes required for this modification are made in the supplementary devices resulting in a much more complicated production system.

To cope with this, there has recently been proposed a moving type batch production system in which the measurement tank or the adjusting tank is made movable to reduce the number of measuring devices.

Where this system is applied to the conventional measuring devices however, the measuring time differs depending on the magnitude of the target value. If the target value is large, the measurement requires much time, and it follows that the capacity in the moving type production system is time-limited. The prior art method to increase the capacity requires a large number of measuring devices.

This prior method however, contributes to an increase in the number of measuring devices, with the result that an elapsed time at the station for supplying the medical liquid is further extended. A large number of measuring devices are needed in terms of such factors as a range of target values restriction of measuring time and the measuring accuracy. For this reason, the operating time increases because time must be spent connecting and disconnecting pipes or ducts.

In a production system for photographic photo-sensitive materials, light-shielding has to be maintained because of the photo-sensitivity of the materials. An increase in the number of coupling portions makes the system more complicated, and variations in carrying capacity exerts unfavorable influences on the performance of the product.

Embodiments of movable-type measuring liquid mixer of the present invention will now be described with reference to the accompanying drawings.

Figure 23:
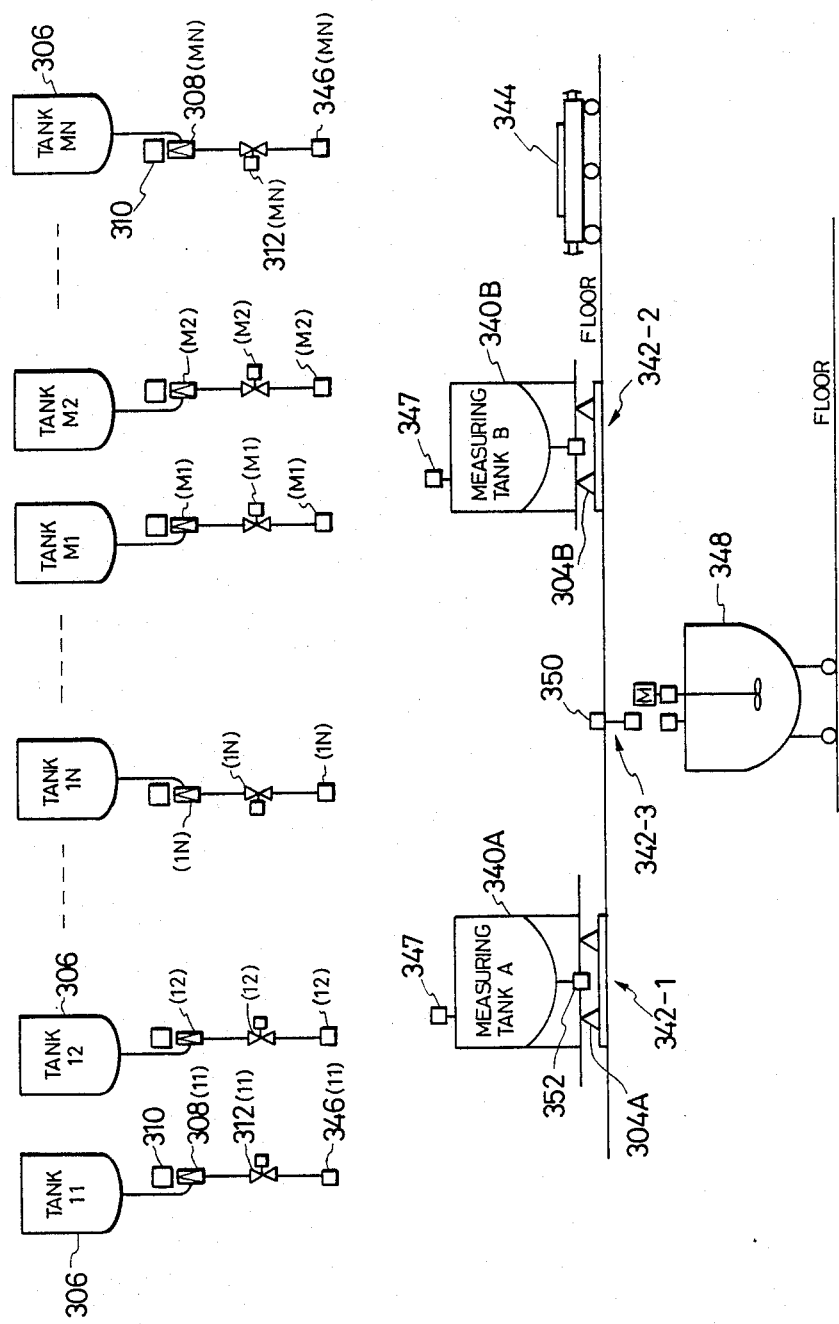
FIG. 23 is a block diagram illustrating one embodiment of a movable liquid measuring mixer according to the present invention.

As illustrated in FIG. 23 there are M groups of liquids which cause no problem of contamination between heterogeneous liquids. Let us imagine that there are N kinds of medical liquids. Various kinds of liquids will be produced. A total number of different liquids will not be in excess of a value given by M×N. In a prior art production system, whether a moving system or a fixed system, there are required at least M×N measuring devices 304, such as load cells, and liquid supply tanks 306. Even more may be required in consideration of measuring range measuring time and measuring accuracy. The present invention, however, makes use of a closed loop measurement control unit for varying flow velocity. Hence, there is no necessity for taking the measuring range, measuring time and measuring accuracy into consideration. A number (M×N) of liquid supply tanks 306 may be sufficient, and a small number of measuring devices 304 will suffice in view of their capacity if no problem of contamination of liquid is created.

Suppose, as illustrated in FIG. 23, that two separate measuring device 304A and 304B are provided and that the number of liquid supply tanks 306 is given by M×N. Since the number is determined from an adjusting (reacting) time of medical liquids, the scale of production and so on, the number of supply liquid containers required may be more than M×N in some cases.

Each measuring device 304A or 304B includes a control unit having a structure of the control block depicted previously in FIG. 11, and applies its outputs to a plurality of N opening control valves 308 by a switching process of a change-over device. That is, the N different medical liquids can be measured by the same control algorithm in the same liquid measuring tank 340A.

A host production control unit indicates the mounting of a liquid receiving container 340A for a station 342-1 to, for instance, an unmanned carriage 344 which carries the liquid receiving container 340A between stations. Subsequent to this step, an indication of measuring the liquid in a predetermined one of the liquid supply containers 306 is issued to the measuring device 304A. The measuring device 304A has its output circuit switched to a (12)-th opening control valve 308 and associated stop valve 312 in cooperation with the change-over device. Then, a (12)-th coupler 346 is instructed by another carrier control unit to couple to a matching coupler 347 on the liquid receiving container 340A. Immediately after the measuring state has been confirmed under such conditions, a production control unit issues a measurement initiating command. The measuring device 304A initiates the measurement on the basis of the predetermined algorithm. The highly accurate measurement is effected by the closed loop measurement control unit for varying the flow velocity. The measurement is accomplished within a short period of time over a wide range of weight by changing the degree of opening of the (12)-th opening control valve 308.

The above-described operations are executed in accordance with the specified contents of the desired products and the required types of medical liquids are all measured.

The process then proceeds to a transfer of liquid to an adjusting tank 348 positioned on the downstream side.

When an indication of a shift to a station 342-3 is issued from the host production control unit, the carriage 344 carries the liquid receiving container 340A to the station 342-3 to connect it to a pipe connecting device 350. If an adjusting tank 348 serves as the moving device depicted in FIG. 23 this tank 348 is also able to move and is connected to the lower portion of the pipe connecting device 350.

Upon confirmation of coupling, a foot valve 351 of the liquid receiving container 340A is opened under the control of the carrier control unit and the liquid is thereby transferred to the adjusting tank 348.

Figure 24:
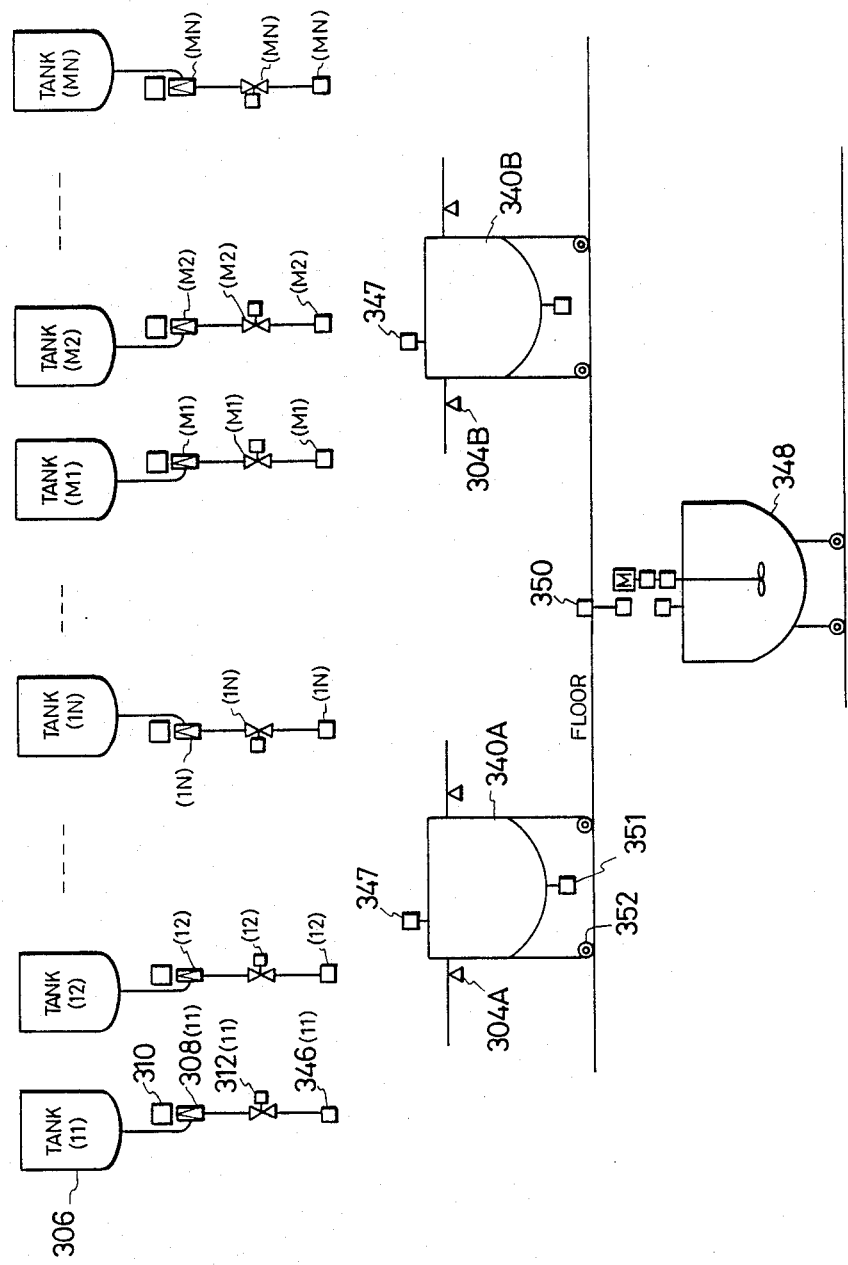
FIGS. 24 and 25 are block diagrams illustrating two movable embodiments of the liquid measuring mixer of the present invention.

FIG. 23 illustrates a carrying situation in which the measuring devices 304A and 304B are placed at the stations 342-1 and 342-2 and the unmanned carriage 344 carries the liquid receiving container 340A to a predetermined position in the measuring system. However, as illustrated in FIG. 24, the liquid receiving container 340A may itself have a carrier mechanism dedicated to it by providing to it a measuring device 304A and wheels 352. Unlike the system of FIG. 23, the coupling device 347 is not fixed to the station. However, an electrical connecting device such as a positional detecting sensor has to be provided in every coupling position.

Figure 25:
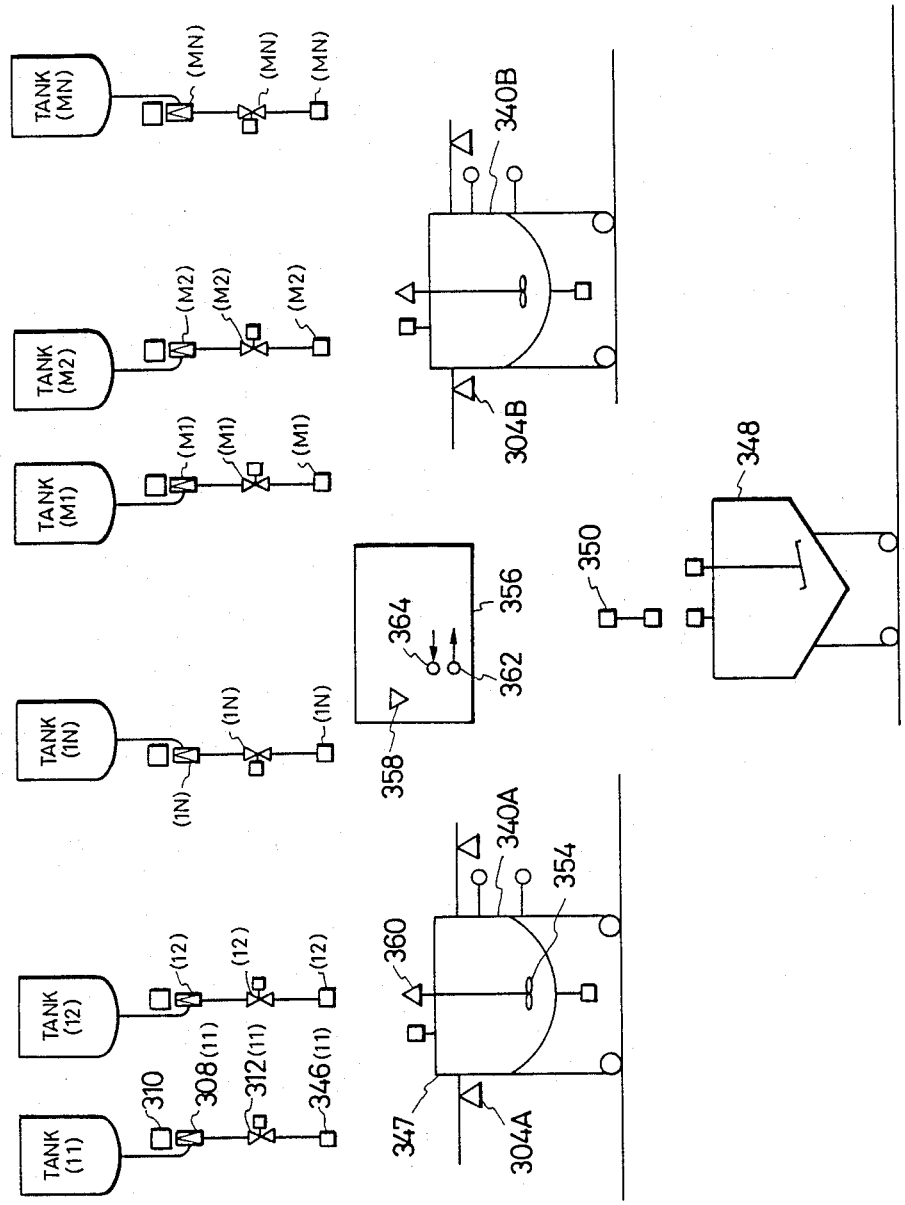
Figure 26:
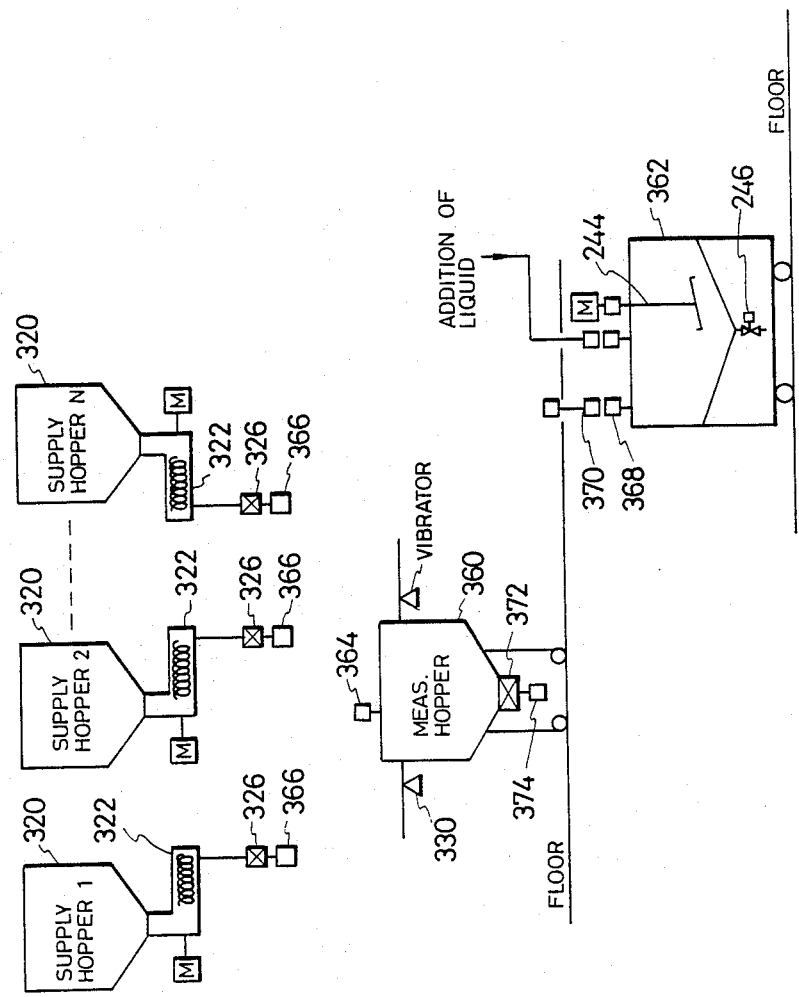
FIG. 26 is a block diagram illustrating one embodiment of a movable powder measuring mixer according to the present invention.
Figure 27:
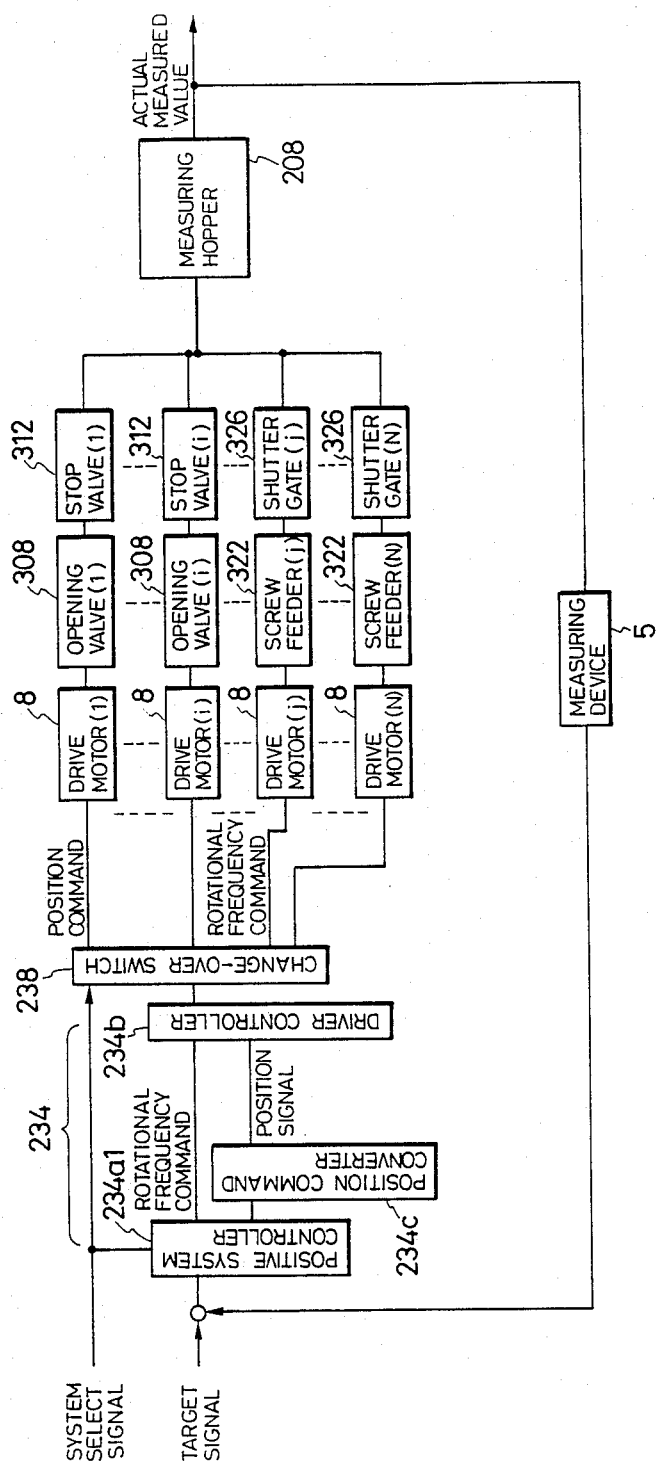
FIG. 27 is a block diagram illustrating closed loop control relative to the embodiment of FIG. 26.

Blades of a stirrer 354, as illustrated in FIG. 25, may be added to the liquid receiving container 304A and the thus arranged liquid receiving container 304A is conveyed to a stirrer station 356. The stirrer station 356 has a rotation coupling 358 to mate with a stirrer coupling 360 on the container 340A. It also has a coupler 362 and a hot water port 364 to mate with corresponding elements on the container 340A. The stirring and heating provide reactive and mixing functions to the receiver container 304A so that is may serve as an adjusting tank. This arrangement offers a system which yields much higher efficiency.

In the above-described embodiment, the measuring tank 304A used in the measuring process involves the use of the load cell. The situation is, however, the same if other types of measuring devices are employed. Especially when a differential pressure transmitter is applied to the receiving tank 304A in FIGS, 24 and 25, the liquid receiving container can be fixed to an automatic travelling vehicle, thereby facilitating its manufacture. Consequently, the influence of vibration or the like is removed.

In the liquid measuring mixer of the above embodiment, a liquid receiving container receives and intermixes a plurality of liquids supplied from a plurality of liquid supply containers after cumulatively measuring the liquids. The liquid measuring mixer according to the present invention is improved such that each of the liquid supply containers includes an opening control valve disposed in a supply. A measuring device associated with the liquid receiving container measures the liquid fed from each of the liquid supply containers. A liquid measurement control unit having a change-over device operates as a closed loop control type precision measuring control unit which performs the measurement by varying the flow velocity of the supplied liquid by varying the degree of opening of each of the opening control valves corresponding to respective measured values of the supply liquids. Lastly, a moving device moves the liquid receiving container between the different supply systems. A highly accurate measurement can quickly be performed without being subject to the influence of fluctuations in flow velocity which are caused by disturbances and variations in the property of the liquid and the measurement can be performed over a wide range of weights in a short time. Moreover, the equipment can be simplified and the number of measuring devices is decreased. Even in the case of large-scale equipment, the production capability increases. Besides, the product quality can be enhanced due to the large-scale adjustment and loss of raw materials can be reduced. As a result, it is possible to obtain reductions in initial cost, maintenance cost and running cost as well. In addition, the reliability can be improved.

The embodiment of movable-type powder mixer of the present invention will hereinafter be described.

Let us now imagine that there are prepared, as illustrated in FIG, 23. N types of pharmaceutical powders and that there are many kinds of products to be produced. A total number of component pharmaceutical powders for every kind of product is less than N. In a conventional production system, whether a moving system or a fixed system, there are required multiple supply hoppers 320 for the same pharmaceutical powder and separate measuring device for every king of product, the total number of which is greater than N, in view of a wide measuring range, a reduction in measuring time and an increase in measuring accuracy. The present invention, however, makes use of a closed loop measurement control unit for varying the flow velocity, and hence there is no necessity for considering the measuring range, measuring time and measuring accuracy. The supply hoppers 320 suffice, and the number of measuring devices may be significantly less than the number determined by the carrying capacity, if there is no problem relating to contamination of the powders.

Let us assume that there is provided a single measuring device 330, namely, a load cell, N separate supply hoppers 330 may be provided. In some cases, however, the number of the measuring devices 330 may be otherwise determined, taking into consideration the adjusting time of pharmaceutical powders and the scale of production relative to the different types of products and hence the number may exceed N.

Every measuring device includes a measurement control unit represented by the control block depicted in FIG, 27. The measuring device applies its outputs to a selected one of a plurality of flow rate adjusters, such as opening control valves 308 or screw feeders 322 (numbered 1 through N). The selection is accomplished by the switching of a change-over device 238. That is, the multiplicity of pharmaceutical powders are measured by the same control algorithm in the same powder measuring hopper 208.

A host production control unit outputs to a self-moving measuring hopper 360 an indication of a load to be delivered to an adjusting tank 362. The measuring device 330 has its output switched to a stop valve 326 in cooperation with the change-over device 238. A transport control device provides an indication of coupling between a coupling device 364 on the measuring hopper 360 from a coupling device 366 downstream of the stop valve 326. In such a situation, when a measuring state is confirmed, the host production control unit outputs a measurement initiating signal. The measuring device 330 starts the measurement in accordance with the predetermined algorithm. Then, the highly accurate measurement is carried out by the closed loop measurement control unit and is finished within a short period of time over a wide measuring range. The flow velocity is varied by changing a flow velocity with the flow rate adjusters (screw feeders 322). The above-described operations are sequentially executed in accordance with the desired mix. After all pharmaceutical powders of the required types have been measured the process proceeds to an operation of transferring the powders to the downstream adjusting tank disposed on the lower stream.

The adjusting tank 362 moves to a position to have its connector to be coupled to the lower portion of a pipe connecting device 370. After confirming the connection, a foot valve or discharge gate 372 of the measuring hopper 360 is so controlled by the controlling device as to be opened, thus transferring the powder through its connector 374 and the connecting device 370 to the adjusting tank 362.

Referring to FIG, 26, the measuring device or load cell 330 is placed in the vicinity of the measuring hopper 360. The moving device for carrying the measuring hopper 360 is of the self-moving type. However, a system for carrying the hopper by use of an unmanned carriage after completion of the measurement at a predetermined position is also usable. It is required that an electrical connecting device such as a positional sensor be provided in every connecting position.

Blades of a stirrer may be added to the measuring hopper 360 to allow this container 360 to act as a mixer, thus forming an adjusting tank. As a result, a system having a much higher efficiency can be provided.

The load cell has been described as the detecting device for the measurement. The situation is however, the same if other types of tank measuring detectors are employed.

When using the measurement control unit which provides both for positive measuring in the measuring hopper 360 and for negative measuring by mounting another measuring device on the supply hopper 320, precise measurement is practicable over a still wider range.

In a powder measuring mixer in which a powder receiving container receives powders from a plurality of supply containers after cumulatively measuring the powders, the improved measuring mixer according to the present invention is arranged such that each of the supply containers includes a flow rate adjuster fitted to a powder supply pipe. A measuring device for measuring the powders supplied from the supply containers is disposed on the side of the powder receiving container. A powder measurement control unit provides closed loop control and precision measuring and has a changeover device. In the measurement, flow rates of each of the flow rate adjusters are varied, corresponding to a measured value of the supplied powder. Further, a moving device moves the powder receiving container. In the system to which the control unit according to the present invention is applied, the highly accurate measurement can be quickly performed without being subject to the influence of fluctuations in the flow velocity which are caused by disturbance and variations in property of the powder. The measurement is performed over a wide range of weights in a short time. Moreover, the equipment can be simplified and the number of measuring devices are decreased. Even in the case of large-scale equipment, the production capability is increased. Additionally, the product quality can be enhanced due to the large-scale adjustment, and loss of raw materials can be reduced. As a result it is possible to obtain reductions in initial cost, maintenance cost and running cost as well. In addition the reliability can be improved.

Fuzzy inference will now be described. Fuzzy inference, used in a fuzzy control system, is intended to emulate control by a human operator. If the operator observes that the deviation between a target value and a measured value is large and a time rate variation of this deviation is small, then he would increase the flow rate which decreases the deviation more quickly. On the other hand, if he observes that the deviation is small but the time rate variation is somewhat large, then he would slightly decrease the flow rate. Fuzzy control is discussed by E. H. Mamdani in a technical article entitled "Application of Fuzzy Algorithms for Control of a Simple Dynamic Plant" appearing in the Proceedings of IEEE, vol. 121, 1974 at pages 1585–1588 and by L. A. Zadeh in a memorandum entitled "Theory of Fuzzy Sets", Memo No. ERL-M502, Electronic Research Lab., University of California. Berkeley (1975).

Figure 28:
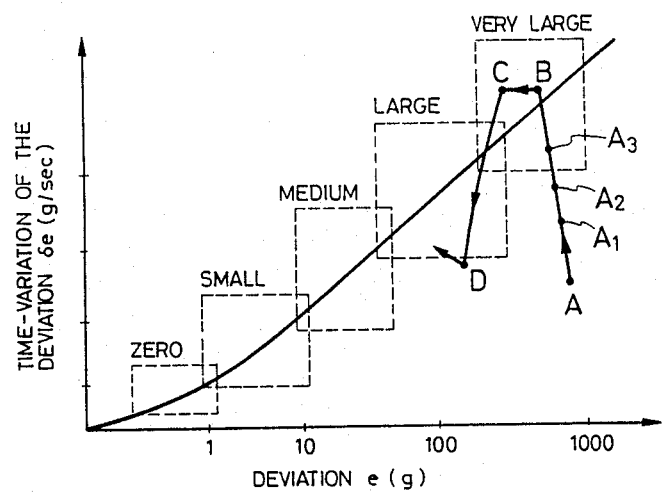
FIGS. 28, 29, 30 and 31 are diagrams used for explaining fuzzy control.

In FIG. 28 is plotted the deviation e (here the difference between the target weight and the actual measured weight) as a function of the time variation $\delta e$ (here the difference of the deviation e between the present and the past measuring cycles). If the measured deviation e and the measured time variation $\delta e$ fall within a balance zone, then the current flow rate is appropriate in view of the current deviation so that the valve opening or the like is not required to be changed. Rather than performing an exact arithmetic computation, however, the variables are designated by "vague" variables such as very small, small, medium, large and very large.

If the variables are designated by these vague variables and by membership functions and if a control method is defined by "if-then" rules, fuzzy measurement control becomes possible. A fuzzy rule is generally expressed in the form of: if e is A and $\delta e$ is B, then $\delta u$ is C. In the present invention, e is the deviation, $\delta e$ is the time variation of the variation and $\delta u$ is the time variation (between control cycles) of a quantity controlling the flow, such as the amount of opening of the control valve. The variables A. B and C in the rules are likewise defined by the vague variables, very small, small, etc.

Figure 29:
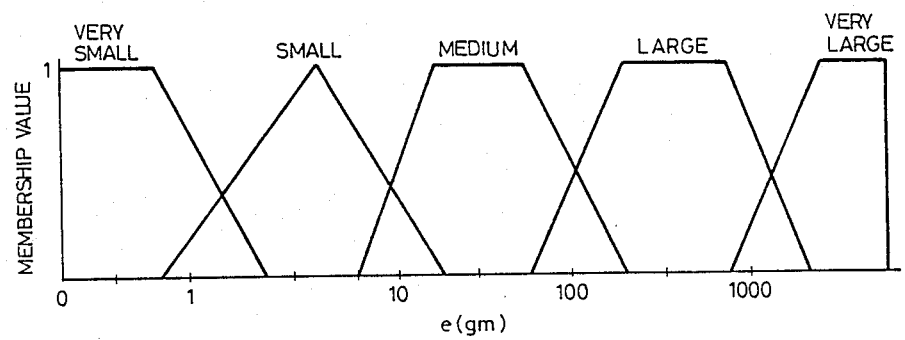

The membership functions are defined for each of the deviation e, the time variation of the deviation $\delta e$ and the time variation of the control quantity $\delta u$. Such a membership function for the deviation e (in units of grams) is plotted in FIG. 29. The vertical axis is the membership value, a membership function varying between 0 and 1. If the measured deviation is 3, then the deviation at the current measuring cycle is determined to be "small". Similar membership functions must be created for $\delta e$ and $\delta u$.

Figure 30:
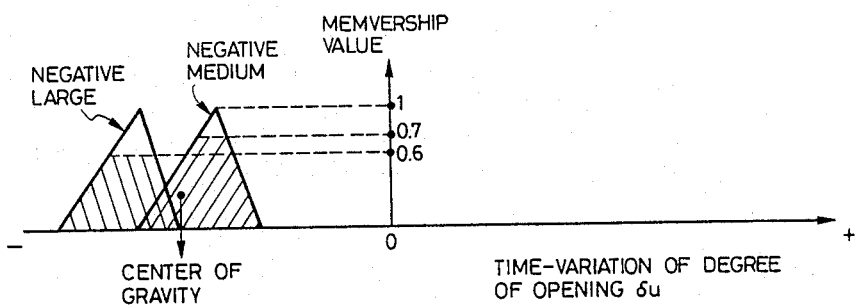

For fuzzy control, a number of fuzzy rules are defined beforehand. For example, a first rule is that if e is small and $\delta e$ is large, then $\delta u$ is negative large; and a second rule is that if e is small and $\delta e$ is medium, then $\delta u$ is negative medium. Other rules become apparent from FIG. 28. When each of e and $\delta e$ falls in only one zone of the vague variables, then a single fuzzy rule using those vague variables is used to obtain the operation quantity $\delta u$. If, however, the observed quantity falls in two zones of vague variables, two fuzzy rules for the observed quantity must be used with the membership values acting as weights in combining the "then" values of the operation quantities $\delta u$. For instance, FIG. 30 is a diagram used for obtaining the control quantity $\delta u$. Providing that e has a membership value 0.8 in small zone, and $\delta e$ has a membership value 0.6 in large zone and value 0.7 in medium zone. Further, providing that fuzzy rules are (1) e is small and $\delta e$ is large, the $\delta u$ is negative large and (2) e is small and $\delta e$ is medium, then $\delta u$ is negative medium. In this case, a membership value of $\delta u$ is determined at smaller one of values of e and $\delta e$ (other selection is possible). Accordingly, the membership value of $\delta u$ is 0.6 when rule (b 1) is used, and 0.7 when rule (2) is used. From the membership values, $\delta u$ is obtained by calculating, for example, the center of gravity of the area hatched in FIG. 30.

The fuzzy control will be described in more detail with reference to FIG. 9.

Figure 31:
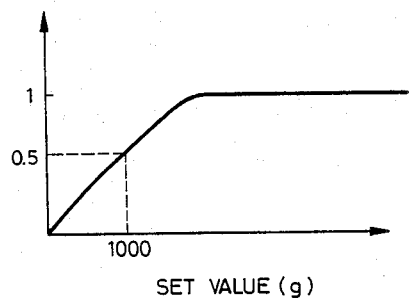

An initial opening degree of the valve is determined by a membership function as shown in FIG. 31. For example, when the set value is 1000 g, a membership value corresponding to the set value is 0.5 from FIG. 31. The maximum opening degree of the valve is set at 70.0 mm based on the flow rate characteristics of the valve, so that the initial opening degree of the valve is set at 70.0×0.5=35 mm. The fuzzy control is not conducted for a while (wastful time). Since it takes a time to transfer the liquid from a supply tank to a measurement tank as shown in FIG. 2, if the fuzzy control is conducted immediately after initiating the measurement, the opening degree of the valve may be increased excessively. Accordingly, the fuzzy control is not conducted for the wastful time, which is within 0–9.9 seconds.

In the measurement, fuzzy rules used are as follows:

(1) If deviation e is very large and its time-variation $\delta e$ is medium, then time-variation of opening degree $\delta u$ is positive medium, (2) If e is very large and $\delta e$ is large, then $\delta u$ is positive small, (3) If e is very large and $\delta e$ is very large, then $\delta u$ is zero, (4) If e is large and δe is very large, then δu is negative small, (5) If e is medium and δe is very large, then δu is negative medium, (6) If e is medium and δe is large, then δu is negative small, (7) If e is large and δe is large, then δu is zero, (8) If e is large and δe is medium, then δu is positive small, and so on.

At point A in FIG. 9 or FIG. 28, fuzzy rule (1) is used so that δu is increased. At point $A_1$ in FIG. 28, fuzzy rules (1) and (2) are used so that the opening degree further increases. At point $A_2$ in FIG. 28, fuzzy rule (2) is used. At point $A_3$ in FIG. 28, fuzzy rules (2) and (3) are used. At point B in FIG. 9 or FIG. 28, fuzzy rule (3) is used so that the opening degree of the valve is not varied. At point C in FIG. 9 or 28, fuzzy rules (3) and (4) are used so that the opening degree of the valve is decreased. Between points C and D in FIG. 9 or 28, some fuzzy rules are used as between points A and B At point D in FIG. 9 or 28, fuzzy rule (8) is used so that the opening degree of the valve is increased. In the similar way, the fuzzy control is conducted so that the result of measurement shown in FIG. 9 was obtained.

What is claimed is:

1. A flowing material measuring device, comprising:
a supply container containing a flowable material;
a flow regulator connected to an outlet of said flow container for regulating a flow of said flowable material in at least three non-zero flow quantities;
a receiving container receiving said flowable material from said flow regulator;
a detector associated with said receiving container for measuring a quantity of material received by said receiving container;
a control unit receiving an output of said detector and including means for deriving a deviation between said measured quantity and a target value and a time variation of said deviation and further including means for setting a flow quantity in accordance with said deviation and said time variation of said deviation, said set flow quantity controlling said flow regulator.

2. A flowing material measuring device as recited in claim 1, wherein said setting means operates with fuzzy inference upon said deviation and said time variation.

3. A flowing material measuring device as recited in claim 1, wherein said detector measures a weight of said receiving container.

4. A flowing material measuring device as recited in claim 1, wherein said flowable material is a liquid and said flow regulators are opening control valves.

5. A flowing material measuring device as recited in claim 1, wherein said flowable material is a powder and said detector measures a weight of said receiving container.

6. A flowing material measuring device as recited in claim 1, further comprising a stop gate disposed in a transport path of said flowable material between said flow regulator and said receiving container, said setting means controlling said stop gate.

7. A flowing material measuring device as recited in claim 1 wherein said flow regulator is substantially continuously variable in regulating said flow of said flowable material.

8. A method of measuring a flowable material, comprising the steps of:

regulating a flow rate of a quantity of a flowable material into a receiving container according to at least three non-zero flow rates;
measuring a quantity of material received in said receiving container;
comparing said measured quantity with a target quantity to produce a deviation value;
computing a time variation of said deviation value; and
setting said regulated flow rate in response to said comparing and computing steps.

9. A method as recited in claim 8, wherein said setting step operates with fuzzy inference rules upon said deviation and said time variation.

10. A flowing material measuring mixer, comprising:
at least two supply systems each comprising a supply container containing a respective flowable material and a flow velocity regulator connected to an outlet of said supply container for varying a flow of said flowable material therethrough in at least three non-zero increments;
a receiving container at least connectable to outlets of each of said flow velocity, regulators for receiving said flowable materials from each of said supply systems;
a measuring device associated with said receiving container for measuring a quantity of any of said flowable materials received into said receiving container;
a measurement control unit receiving a target quantity and an output of said measuring device and deriving a deviation therebetween and including means for computing a desired flow quantity in accordance with said deviation; and
means for selectively applying said desired flow quantity to a selected one of said flow velocity controllers.

11. A flowing material measuring mixer as recited in claim 10, wherein said applying means comprises a switch selectively switching signals from said measurement control unit to said flow regulators.

12. A flowing material measuring mixer as recited in claim 11, wherein said computing means operates according to fuzzy inference rules on said deviation and said time variation.

13. A flowing material measuring mixer as recited in claim 10, wherein said measurement control includes means for deriving a time variation of said deviation and wherein said computing means computes said desired flow additionally in accordance with said time variation.

14. A flowing material measuring mixer as recited in claim 10, wherein each of said flow velocity regulators varies said flow in substantially continuous increments.

15. A flowing material measuring mixer as recited in claim 10, further comprising reaction means associated with said receiving container for promoting reactions between a plurality of said flowable materials received in said receiving container.

16. A flowing material measuring mixer as recited in claim 10, wherein said flowable materials are liquids and said flow regulators are opening control valves.

17. A flowing material measuring mixer as recited in claim 10, wherein said flowable materials are powders and said measuring device measures a weight of said receiving container.

18. A flowing material measuring mixer as recited in claim 17, wherein said flow regulators are selected from a screw feeder, an opening degree damper or a rotary device.

19. A flowing material measuring mixer as recited in claim 10, further comprising a further measuring device associated with one of said supply containers for measuring an amount of said flowable material contained therein said computing means further computing said desired flow rate in accordance with an output of said further measuring device.

20. A flowing material measuring mixer as recited in claim 19 further comprising an adjusting container receiving said flowable materials from said receiving container and reaction means associated with said adjusting container for promoting mixing of said flowable materials in said adjusting container.

21. A flowing material measuring mixer as recited in claim 20, wherein said adjusting container receives a mixture of said flowable materials from said receiving container.

22. A flowing material measuring mixer as recited in claim 21, wherein said flowable materials are powders and further comprising liquid supply means connected to said adjusting container.

23. A flowing material measuring mixer- as recited in claim 10, wherein each of said supply systems further comprises an outlet port downstream of said flow velocity regulators and further comprising a moving device for moving said receiving container between said outlets ports of different ones of said supply systems.

24. A flowing material measuring mixer as recited in claim 23, wherein said flowable materials are powders.

25. A flowing material measuring mixer as recited in claim 23, wherein said flowable materials are liquids.

26. A flowing material measuring mixer as recited in claim 23, wherein said moving device is an unmanned carriage for lifting said receiving container.

27. A flowing material measuring mixer as recited in claim 23, wherein said moving device comprises a set of wheels attached to said receiving container.

28. A flowing material measuring mixer as recited in claim 23, further comprising a reaction station comprising reaction means operable with said receiving container and wherein said moving device moves said receiving container between said outlets ports and said reaction station.

29. A flowing material measuring mixer as recited in claim 23, further comprising a reception container comprising a receiving port and wherein said moving device moves said receiving container between said outlet ports and said receiving port.

* * * * *